United States Patent
Srinivas et al.

(10) Patent No.: US 11,374,812 B2
(45) Date of Patent: *Jun. 28, 2022

(54) SYSTEM AND METHOD FOR OBSERVING AND CONTROLLING A PROGRAMMABLE NETWORK VIA HIGHER LAYER ATTRIBUTES

(71) Applicant: VMware, Inc., Palo Alto, CA (US)

(72) Inventors: Anand Srinivas, San Francisco, CA (US); Richard Barry, Los Angeles, CA (US); Abraham Ankumah, San Mateo, CA (US); Daniel Kan, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/827,571

(22) Filed: Mar. 23, 2020

(65) Prior Publication Data

US 2020/0280490 A1   Sep. 3, 2020

Related U.S. Application Data

(63) Continuation of application No. 16/584,810, filed on Sep. 26, 2019, now Pat. No. 10,630,547, which is a
(Continued)

(51) Int. Cl.
*H04L 41/085* (2022.01)
*H04L 41/147* (2022.01)
(Continued)

(52) U.S. Cl.
CPC ......... *H04L 41/0816* (2013.01); *G06N 20/00* (2019.01); *H04L 41/085* (2013.01);
(Continued)

(58) Field of Classification Search
CPC ....... H04L 41/08; H04L 43/12; H04L 41/145; H04L 41/147; H04L 43/04; H04L 43/062;
(Continued)

(56) References Cited

U.S. PATENT DOCUMENTS

| 5,929,855 A | 7/1999 | Benton et al. |
| 7,424,608 B1 | 9/2008 | Cherukumudi et al. |

(Continued)

FOREIGN PATENT DOCUMENTS

| AU | 2014340233 A1 | 6/2016 |
| EP | 2518940 A1 | 10/2012 |

(Continued)

OTHER PUBLICATIONS

Das, Anupam, et al., "Transparent and Flexible Network Management for Big Data Processing in the Cloud," 5th USENIX Workshop on Hot Topics in Cloud Computing, Jun. 25-26, 2013, 6 pages, USENIX, San Jose, CA.

(Continued)

*Primary Examiner* — Shirley X Zhang
(74) *Attorney, Agent, or Firm* — Adeli LLP

(57) ABSTRACT

A system and method for observing and controlling a programmable network via higher layer attributes is disclosed. According to one embodiment, the system includes one or more collectors and a remote network manager. The one or more collectors are configured to receive network traffic data from a plurality of network elements in the network. The remote network manager is configured to connect to the one or more collectors over the Internet via a network interface. The one or more collectors extract metadata from the network traffic data and send the metadata to the network manager.

20 Claims, 13 Drawing Sheets

Related U.S. Application Data continuation of application No. 14/520,238, filed on Oct. 21, 2014, now Pat. No. 10,601,654, and a continuation of application No. 14/520,238, filed on Oct. 21, 2014, now Pat. No. 10,601,654.

(60) Provisional application No. 61/893,789, filed on Oct. 21, 2013.

(51) Int. Cl.

| | | |
|---|---|---|
| *H04L 43/04* | (2022.01) | |
| *G06N 20/00* | (2019.01) | |
| *H04L 41/0816* | (2022.01) | |
| *H04L 43/062* | (2022.01) | |
| *H04L 41/0893* | (2022.01) | |
| *H04L 43/12* | (2022.01) | |
| *H04L 41/14* | (2022.01) | |
| *H04L 41/0823* | (2022.01) | |
| *H04L 43/0876* | (2022.01) | |
| *H04L 43/0829* | (2022.01) | |
| *H04L 41/046* | (2022.01) | |
| *H04L 41/16* | (2022.01) | |

(52) U.S. Cl.
CPC ...... *H04L 41/0823* (2013.01); *H04L 41/0893* (2013.01); *H04L 41/145* (2013.01); *H04L 41/147* (2013.01); *H04L 43/04* (2013.01); *H04L 43/062* (2013.01); *H04L 43/12* (2013.01); *H04L 41/046* (2013.01); *H04L 41/16* (2013.01); *H04L 43/0829* (2013.01); *H04L 43/0876* (2013.01)

(58) Field of Classification Search
CPC ... H04L 43/0829; H04L 41/046; H04L 41/16; H04L 43/0876; G06N 20/00
See application file for complete search history.

(56) References Cited

U.S. PATENT DOCUMENTS

| | | | |
|---|---|---|---|
| 7,636,424 | B1 | 12/2009 | Halikhedkar et al. |
| 8,015,604 | B1 | 9/2011 | Tidwell et al. |
| 8,504,679 | B2 | 8/2013 | Spire et al. |
| 9,026,507 | B2* | 5/2015 | Shraim ............... H04L 63/1425 707/694 |
| 9,143,452 | B2 | 9/2015 | Lumezanu et al. |
| 9,215,142 | B1* | 12/2015 | Herold ............... H04L 43/0817 |
| 9,544,205 | B2 | 1/2017 | Chandrayana et al. |
| 9,619,654 | B2 | 4/2017 | Dolan-Gavitt et al. |
| 9,639,693 | B2 | 5/2017 | Rivera et al. |
| 9,985,982 | B1 | 5/2018 | Bartos et al. |
| 10,193,741 | B2 | 1/2019 | Zafer et al. |
| 10,200,267 | B2 | 2/2019 | Zafer et al. |
| 10,230,609 | B2 | 3/2019 | Chandrasekaran et al. |
| 10,601,654 | B2 | 3/2020 | Srinivas et al. |
| 10,601,691 | B2 | 3/2020 | Chandrasekaran et al. |
| 10,630,547 | B2 | 4/2020 | Srinivas et al. |
| 10,666,494 | B2 | 5/2020 | Zafer et al. |
| 10,740,765 | B1 | 8/2020 | Chheda et al. |
| 11,102,102 | B2 | 8/2021 | Chandrasekaran et al. |
| 2002/0091819 | A1 | 7/2002 | Melchione et al. |
| 2002/0143914 | A1 | 10/2002 | Cihula |
| 2003/0033402 | A1 | 2/2003 | Battat et al. |
| 2003/0200277 | A1 | 10/2003 | Kim |
| 2004/0250124 | A1 | 12/2004 | Chesla et al. |
| 2005/0010821 | A1 | 1/2005 | Cooper et al. |
| 2006/0109793 | A1 | 5/2006 | Kim et al. |
| 2006/0156032 | A1 | 7/2006 | Panjwani |
| 2006/0233115 | A1 | 10/2006 | Matityahu et al. |
| 2006/0253566 | A1 | 11/2006 | Stassinopoulos et al. |
| 2007/0115916 | A1 | 5/2007 | Nguyen et al. |
| 2007/0223432 | A1 | 9/2007 | Badarinath |
| 2007/0232202 | A1 | 10/2007 | Schneeberger |
| 2008/0016412 | A1 | 1/2008 | White et al. |
| 2008/0209015 | A1 | 8/2008 | Le et al. |
| 2009/0013216 | A1 | 1/2009 | Abrashkevich et al. |
| 2009/0257353 | A1 | 10/2009 | Song et al. |
| 2009/0265778 | A1 | 10/2009 | Wahl et al. |
| 2010/0218031 | A1 | 8/2010 | Agarwal et al. |
| 2010/0274596 | A1 | 10/2010 | Grace et al. |
| 2010/0299292 | A1 | 11/2010 | Collazo |
| 2010/0332680 | A1 | 12/2010 | Anderson et al. |
| 2010/0333177 | A1* | 12/2010 | Donley ............... G06F 21/6218 726/4 |
| 2011/0008172 | A1 | 1/2011 | Jette et al. |
| 2011/0047286 | A1 | 2/2011 | Harrang et al. |
| 2011/0296015 | A1 | 12/2011 | Chakravarty et al. |
| 2012/0022916 | A1 | 1/2012 | Todd et al. |
| 2012/0198541 | A1 | 8/2012 | Reeves |
| 2012/0311715 | A1 | 12/2012 | Tal et al. |
| 2013/0054773 | A1 | 2/2013 | Onoue |
| 2013/0060603 | A1 | 3/2013 | Wagner |
| 2013/0094376 | A1 | 4/2013 | Reeves |
| 2013/0117847 | A1* | 5/2013 | Friedman ............... H04L 63/102 726/22 |
| 2013/0159395 | A1 | 6/2013 | Backholm et al. |
| 2013/0176858 | A1 | 7/2013 | Zee et al. |
| 2013/0185438 | A1 | 7/2013 | Lumezanu et al. |
| 2013/0250770 | A1 | 9/2013 | Zou et al. |
| 2013/0290512 | A1 | 10/2013 | Ngoo et al. |
| 2013/0290520 | A1 | 10/2013 | Noo et al. |
| 2013/0298170 | A1 | 11/2013 | ElArabawy et al. |
| 2013/0305090 | A1 | 11/2013 | Kristiansen et al. |
| 2013/0343390 | A1 | 12/2013 | Moriarty et al. |
| 2014/0064066 | A1 | 3/2014 | Lumezanu et al. |
| 2014/0068053 | A1 | 3/2014 | Ravi et al. |
| 2014/0086069 | A1 | 3/2014 | Frey et al. |
| 2014/0133497 | A1 | 5/2014 | Chapman |
| 2014/0156824 | A1 | 6/2014 | Biswas et al. |
| 2014/0201642 | A1 | 7/2014 | Vicat-Blanc |
| 2014/0215058 | A1 | 7/2014 | Vicat-Blanc et al. |
| 2014/0215077 | A1 | 7/2014 | Soudan et al. |
| 2014/0254380 | A1 | 9/2014 | Swenson et al. |
| 2014/0280802 | A1 | 9/2014 | McDowall |
| 2014/0280887 | A1 | 9/2014 | Kjendal et al. |
| 2014/0280889 | A1 | 9/2014 | Nispel et al. |
| 2014/0282823 | A1 | 9/2014 | Rash et al. |
| 2014/0304207 | A1 | 10/2014 | Chandrayana et al. |
| 2015/0085694 | A1 | 3/2015 | Agarwal et al. |
| 2015/0113132 | A1 | 4/2015 | Srinivas et al. |
| 2015/0113133 | A1 | 4/2015 | Srinivas et al. |
| 2015/0117420 | A1 | 4/2015 | Raman et al. |
| 2015/0142935 | A1 | 5/2015 | Srinivas et al. |
| 2015/0142936 | A1 | 5/2015 | Srinivas et al. |
| 2015/0142962 | A1 | 5/2015 | Srinivas et al. |
| 2015/0215334 | A1 | 7/2015 | Bingham et al. |
| 2015/0229661 | A1 | 8/2015 | Balabine et al. |
| 2015/0249587 | A1 | 9/2015 | Kozat et al. |
| 2015/0288557 | A1 | 10/2015 | Gates et al. |
| 2015/0295808 | A1 | 10/2015 | O'Malley et al. |
| 2015/0341285 | A1 | 11/2015 | Aysola et al. |
| 2016/0104114 | A1 | 4/2016 | Speich et al. |
| 2016/0134469 | A1 | 5/2016 | Carter et al. |
| 2017/0099195 | A1 | 4/2017 | Raney |
| 2017/0288987 | A1 | 10/2017 | Pasupathy et al. |
| 2017/0302505 | A1 | 10/2017 | Zafer et al. |
| 2017/0302553 | A1 | 10/2017 | Zafer et al. |
| 2017/0302554 | A1 | 10/2017 | Chandrasekaran et al. |
| 2017/0310546 | A1 | 10/2017 | Nair et al. |
| 2018/0062941 | A1 | 3/2018 | Brown et al. |
| 2019/0132230 | A1 | 5/2019 | Chandrasekaran et al. |
| 2019/0149396 | A1 | 5/2019 | Zafer et al. |
| 2020/0044921 | A1 | 2/2020 | Srinivas et al. |
| 2020/0287779 | A1 | 9/2020 | Zafer et al. |
| 2020/0287790 | A1 | 9/2020 | Srinivas et al. |
| 2020/0287791 | A1 | 9/2020 | Srinivas et al. |

(56) References Cited

U.S. PATENT DOCUMENTS

| | | |
|---|---|---|
| 2020/0287816 A1 | 9/2020 | Chandrasekaran et al. |
| 2021/0385143 A1 | 12/2021 | Chandrasekaran et al. |

FOREIGN PATENT DOCUMENTS

| | | |
|---|---|---|
| EP | 2582100 A1 | 4/2013 |
| EP | 3061210 A1 | 8/2016 |
| WO | 2003096729 A1 | 11/2003 |
| WO | 2005109754 A1 | 11/2005 |
| WO | 2009032925 A1 | 3/2009 |
| WO | 2015061353 A1 | 4/2015 |
| WO | 2017184627 A2 | 10/2017 |
| WO | 2019094630 A1 | 5/2019 |

OTHER PUBLICATIONS

Non-Published Commonly Owned U.S. Appl. No. 16/821,957, filed Mar. 17, 2020, 91 pages, VMware, Inc.

Non-Published Commonly Owned Related U.S. Appl. No. 16/880,948 with similar specification, filed May 21, 2020, 59 pages, VMware, Inc.

Non-Published Commonly Owned Related U.S. Appl. No. 16/880,978 with similar specification, filed May 21, 2020, 61 pages, VMware, Inc.

PCT International Search Report and Written Opinion of Commonly Owned International Patent Application PCT/US2014/061628, dated Jan. 26, 2015, 15 pages, International Searching Authority (KR).

Wang, Ting, et al., "Spatio-temporal Patterns in Network Events," Proceedings of the 2010 ACM Conference on Emerging Networking Experiments and Technology, Nov. 30-Dec. 1, 2010, 12 pages, ACM, Philadelphia, PA, USA.

* cited by examiner

SYSTEM AND METHOD FOR OBSERVING AND CONTROLLING A PROGRAMMABLE NETWORK VIA HIGHER LAYER ATTRIBUTES

CROSS REFERENCE TO RELATED APPLICATIONS

This application is a continuation application of U.S. patent application Ser. Nos. 14/520,238 and 16/584,810, now published as U.S. Patent Publications 2015/0113132 and 2020/0044921. U.S. patent application Ser. No. 16/584,810 is a continuation application of U.S. patent application Ser. No. 14/520,238. U.S. patent application Ser. No. 14/520,238 claims the benefit of U.S. Provisional App. Ser. No. 61/893,789, filed on Oct. 21, 2013. U.S. Provisional Patent Application 61/893,789 and U.S. Patent Publications 2015/0113132 and 2020/0044921 are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure pertains generally to the fields of indexing and controlling networks. More particularly, the present disclosure relates to a system and method for observing and controlling a programmable network via higher layer attributes.

BACKGROUND

Obtaining business-level insight and control over the applications, users and devices in modern networks is becoming extremely challenging. On the applications front, modern networks have a huge mix in application types and deployment locations. For example, a single application might be implemented as a distributed and multi-tier application with the inter-component communication running over different parts of the network. Similarly, business applications may be hosted off-premise in the cloud (e.g., salesforce.com), on-premise in a local data center (e.g., SAP), or on-premise between hosts (e.g., unified communications). On the users and devices front, modern networks are accessed by a myriad of devices from wired desktops to wireless devices such as laptop computers, mobile phones, and tablet PCs.

Traditional network security and performance monitoring tools or policy enforcing firewalls require dedicated hardware deployed inline with user devices. However, dedicated hardware has drawbacks in supporting various types of applications and devices deployed in different parts of the network.

SUMMARY

One embodiment of the present disclosure is a system for monitoring a network. In this embodiment, the system includes one or more collectors and a remote network manager. The one or more collectors are configured to receive network traffic data from a plurality of network elements in the network. The remote network manager is configured to connect to the one or more collectors over the Internet via a network interface. The one or more collectors extract metadata from the network traffic data and send the metadata to the network manager.

According to some embodiments, the system further has a programmable controller that controls at least some of the plurality of network elements. The remote network manager controls the plurality of network elements via the programmable controller. The remote network manager or the one or more collectors are further configured to index the network enabling efficient search and retrieval of the metadata.

According to some embodiments, the collector receives mirror traffic data from the plurality of network elements and indexes the network. The manager programs the programmable network element to send filtered network traffic data from the plurality of network elements to the collector. The filtered network traffic data is used for network analysis and extracting the metadata. The collector is further configured to receive statistics about the network, topology information about the network, input from one or more enterprise systems, or combinations thereof.

According to some embodiments, the collector collects the filtered network traffic data based on a time-varying schedule. The time-varying schedule for sending the filtered network traffic data is determined by a bandwidth constraint at the collector, and/or a network topology and a network policy.

According to some embodiments, the manager time-aligns the metadata received from the network traffic data with data received from the enterprise system. The manager applies a control loop to determine whether a high level control objective is met after programming the programmable network element. The manager is further configured to simultaneously and centrally analyze a network condition of a plurality of networks, learn a pattern from a first network of the plurality of networks, and apply the pattern to a second network of the plurality of networks. The manager extracts a lower layer control primitive affecting a network policy and programming the programmable network element based on the lower layer control primitive such as an access control list (ACL), quality of service (QoS), rate limit settings, or combinations thereof. The manager maintains a relationship between a high level network policy and the low level control primitive.

Another embodiment of the present disclosure is also a system for monitoring a network. This embodiment includes a collector that is configured to communicate with a programmable switch that receives network traffic from a plurality of network elements of the network. In this embodiment, the collector is configured to receive the network traffic, extract features from the network traffic, and program the programmable switch to receive filtered network traffic from one or more of the plurality of network elements.

Yet another embodiment of the present disclosure is also a system for monitoring a network. This embodiment also includes a collector that is configured to communicate with a programmable switch that receives network traffic from a plurality of network elements of the network. The collector is further configured to receive the network traffic, extract features from the network traffic, and index the network based on high layer information, wherein the high layer information is one or more of network users, network applications, network devices, and network behaviors. The collector is further configured to program the programmable switch to receive filtered network traffic from one or more of the plurality of network elements.

Yet another embodiment of the present disclosure is a system for monitoring a network, where the system includes a collector and a manager. In this embodiment, the collector is configured to communicate with a programmable switch that receives network traffic from a plurality of network elements of the network, and the collector is configured to receive the network traffic, extract features from the network traffic, and program the programmable switch to receive filtered network traffic from one or more of the plurality of network elements. The manager is configured to communicate with the collector to receive the extracted features from the collector, summarize the extracted features, and index the network based on high layer information, wherein the high layer information is one or more of network users, network applications, network devices, and network behaviors. The manager can, for instance, be located in the cloud. This embodiment can include a plurality of collectors.

Yet another embodiment of the present disclosure is a system for monitoring a network that includes a collector and a manager. In this embodiment, the collector receives network traffic from a plurality of network elements of the network, and extract features from the network traffic. The manager is configured to communicate with the collector to receive the extracted features, summarize the extracted features, and index the network based on high layer information, wherein the high layer information is one or more of network users, network applications, network devices, and network behaviors. In addition, this embodiment can include a plurality of collectors.

Yet another embodiment of the present disclosure is a system for monitoring a network, where the system includes a programmable switch and a collector. The programmable switch is configured to receive network traffic from a plurality of network elements of the network. The collector is configured to communicate with the programmable switch, and the collector is further configured to receive the network traffic, extract features from the network traffic, and program the programmable switch to receive filtered network traffic from one or more of the plurality of network elements. In this embodiment, the collector is further configured to receive statistics about the network, topology information about the network, input from other enterprise systems, or combinations thereof. In addition, the collector is further configured to index the network enabling efficient search and retrieval of the metadata.

Another embodiment of the present disclosure is a system for controlling a network. This embodiment includes a collector that is configured to communicate with a programmable switch that receives network traffic from a plurality of network elements of the network, wherein the collector is configured to receive the network traffic, extract features from the network traffic, and program one or more of the network elements to enforce one or more policies.

Another embodiment of the present disclosure is a system for controlling a network, where the system includes a programmable switch and a collector. In this embodiment, the system includes a programmable switch that is configured to receive network traffic from a plurality of network elements of the network, and a collector that is configured to communicate with the programmable switch, wherein the collector is further configured to receive the network traffic, extract features from the network traffic, and program one or more of the network elements to enforce one or more policies. At least one of the one or more policies can be based on security or performance issues with the network.

Yet another embodiment of the present disclosure includes a system for monitoring and controlling a network. This embodiment includes a collector that is configured to communicate with a programmable switch that receives network traffic from a plurality of network elements of the network. In addition, in this embodiment, the collector is configured to receive the network traffic, extract features from the network traffic, program the programmable switch to receive filtered network traffic from one or more of the plurality of network elements, and program one or more of the network elements to enforce one or more policies.

In one embodiment, the present system also referred to herein as the Loupe System, crawls, summarizes, indexes, queries, and/or controls networks. The networks can include a combination of physical and virtual network elements. Some embodiments of the present disclosure provide higher layer awareness and instrumentation of such networks where the underlying network elements may or may not have that higher-layer processing capability.

In one embodiment, the present disclosure can relate to visibility issues, such as crawling, summarizing, indexing and querying. In this embodiment, the visibility part of the method and system entails extracting key features from different parts of the network and binding these features to higher layer information such as users, applications, devices and behaviors. This higher layer information can then be stored and made query-able via natural language processing, and a ranking of responses can be computed and presented to the user.

Another embodiment of the present disclosure relates to controlling a network. According to one such embodiment, the control part entails using the information from the visibility part to enforce high-level policies and automatically remediating security and performance issues in the network. In some embodiments, one technique is to, dynamically and in real-time, track the binding of higher layer information to the specific lower layer primitives that the physical and virtual network elements understand and can be programmed with. This embodiment dynamically programs the devices via the lower layer primitives, thereby achieving the desired higher layer objective.

The disclosed embodiments further relate to machine readable media on which are stored embodiments of the disclosed invention described in herein. It is contemplated that any media suitable for retrieving instructions is within the scope of the disclosed embodiments. By way of example, such media may take the form of magnetic, optical, or semiconductor media. The disclosed embodiments also relate to data structures that contain embodiments of the disclosed invention, and to the transmission of data structures containing embodiments of the disclosed invention.

Further aspects of the disclosed embodiments will be brought out in the following portions of the specification, wherein the detailed description is for the purpose of fully disclosing the various embodiments without placing limitations thereon.

BRIEF DESCRIPTION OF THE DRAWING

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Figure 1:
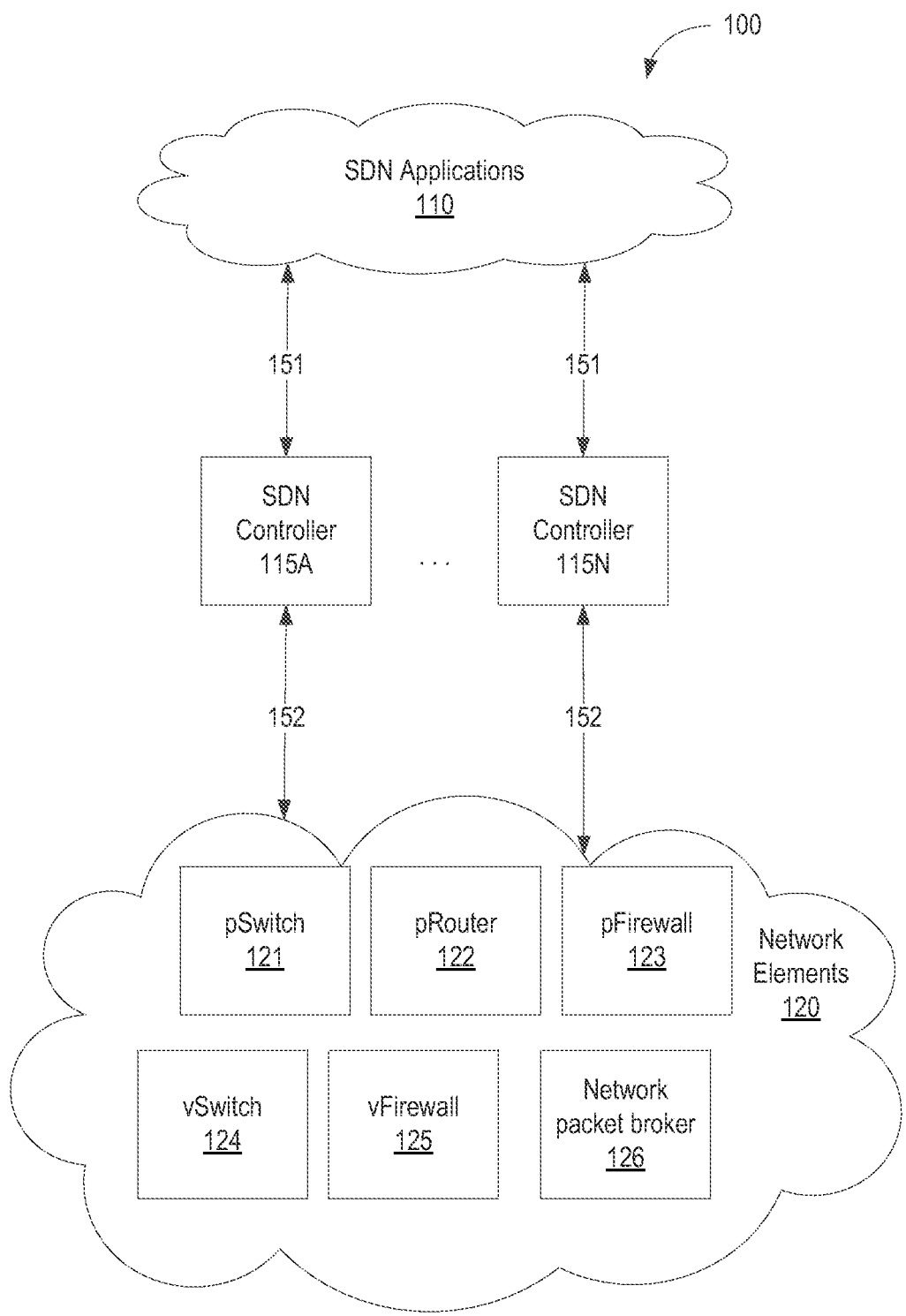
FIG. 1 illustrates a functional diagram of a SDN-enabled network, according to one embodiment.

Persons of ordinary skill in the art will understand that the present disclosure is illustrative only and not in any way limiting. Other embodiments of the presently disclosed system and method readily suggest themselves to such skilled persons having the assistance of this disclosure.

Each of the features and teachings disclosed herein can be utilized separately or in conjunction with other features and teachings to provide a system and method for observing and controlling a programmable network via higher layer attributes. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

There are four main areas of technology that may incorporate embodiments of the present disclosure: (1) network functions virtualization (NFV), (2) software defined networking (SDN), (3) application delivery network (AND), and (4) network packet brokers and network security and performance monitoring tools. The present system and method brings together aspects of these technologies to provide visibility as well as control of networks.

FIG. 1 illustrates a functional diagram of a SDN-enabled network, according to one embodiment. The SDN-enabled network 100 includes SDN applications 110 and network elements 120 that are linked via one or more SDN controllers 115A-115N. The "p" and "v" prefixes on the network elements 120 indicate physical and virtual network elements, respectively.

The network elements 120 include a physical switch (pSwitch) 121, a physical router (pRouter) 122, a physical Firewall (pFirewall), a virtual switch (vSwitch) 124, a virtual firewall (vFirewall) 125, and a physical network packet broker 126. It is appreciated that the network elements 120 can include any number of physical switches 121, physical routers 122, physical firewalls 123, virtual switches 124, virtual firewalls 125, and physical network packet broker 126, and other physical or virtual network elements, without deviating from the present disclosure.

Network functions virtualization (NFV) refers to the implementation and deployment of software-based network elements. Such software-based network elements typically run on generic processing hardware (e.g., x86 machines) as opposed to non-NFV network elements that require dedicated hardware (e.g., Application-Specific Integrated Circuits (ASICs)). Examples of NFV-type network elements include, but are not limited to, a virtual switch 124 and a virtual firewall 125. It is appreciated that other types of NFV-type network elements may be implemented without deviating from the present disclosure. Such NFV-type network elements may be run as a virtual machine on top of a hypervisor that runs on commodity hardware. The present system and method provides monitoring and controlling of NFV network elements, but it is noted that the present system and method can also monitor and control non-virtualized network elements and/or functions without deviating from the present disclosure.

Software defined networking (SDN) describes the generic concept of separating the entirety or some portion of the control plane from the data plane of network elements. For simplicity, the term "network element" herein can refer to a physical, a virtual network element, or a combination of both.

The separate portion of the control plane is typically centralized in a SDN controller. The southbound interfaces 152 between the SDN controller 115 and the network elements 120 can be open (e.g., OpenFlow®) or proprietary (e.g., onePK®). The SDN controller 115 provides programmatic northbound interfaces 151 for SDN applications 110 to both observe and dynamically configure network elements. Similar to a SDN application, the present system and method utilizes the northbound interfaces 151 between the SDN applications 110 and the SDN controller 115. It is noted that the present system and method can work with a non SDN-enabled network, a partially or fully enabled SDN network, or even a network including heterogeneous networks. For example, the SDN controller 115 of FIG. 1 and a wireless controller 259 of FIG. 2 are an example of an enterprise system.

An application delivery network (ADN) encapsulates several technologies that provide application-layer functionality in the network. A next generation application firewall, for example, is an appliance that provides inline access control functionality as a function of L4-L7 header information as well as application, user and content layer metadata. This appliance can perform inline deep packet inspection to identify in real-time applications and perform access control.

The control embodiments of the present system and method provides capabilities of the next generation application firewall using basic network elements such as switches and routers that otherwise would not have such capability. The present system and method can reduce hardware and distributed functionality.

The network packet broker 126 (or a matrix switch) gathers, aggregates and filters network traffic from port mirrors, network TAPs, and probes. The network packet broker 126 serves the filtered network traffic to network security and performance tools as per their network security and performance tools. For example, a network security and performance tool may only support 1 GBps of traffic, and a network packet broker 126 can be manually configured to filter and shape traffic from a 10 GBps link to conform to the constraint of the network security and performance tool. Typically the network packet broker 126 is decoupled from the network security and performance tools to which it delivers the packets.

A portion of the present system and method performs as a network security and performance tool. In one embodiment, the present system and method intelligently and dynamically programs a network packet broker 126 to gain access to the traffic it needs. The present system and method also summarizes and indexes higher layer information about users, applications, devices, behaviors, and the like (e.g., via machine learning), and enables the higher layer information to be queried using a natural language processing technique. According to one embodiment, the present system and method is deployed in a cloud to enable cross-network learning. "Cloud" herein refers to a computer and storage platform service hosted over a wide area network (e.g., the Internet). It is noted that both ADN and network security/performance monitoring tools are typically deployed on premise.

The present system and method observes and controls a programmable network via higher layer attributes and addresses the drawbacks of prior systems for monitoring and controlling networks. The discussion is divided into three sections: (1) architecture, (2) visibility, and (3) control.

Architecture

Figure 2A:
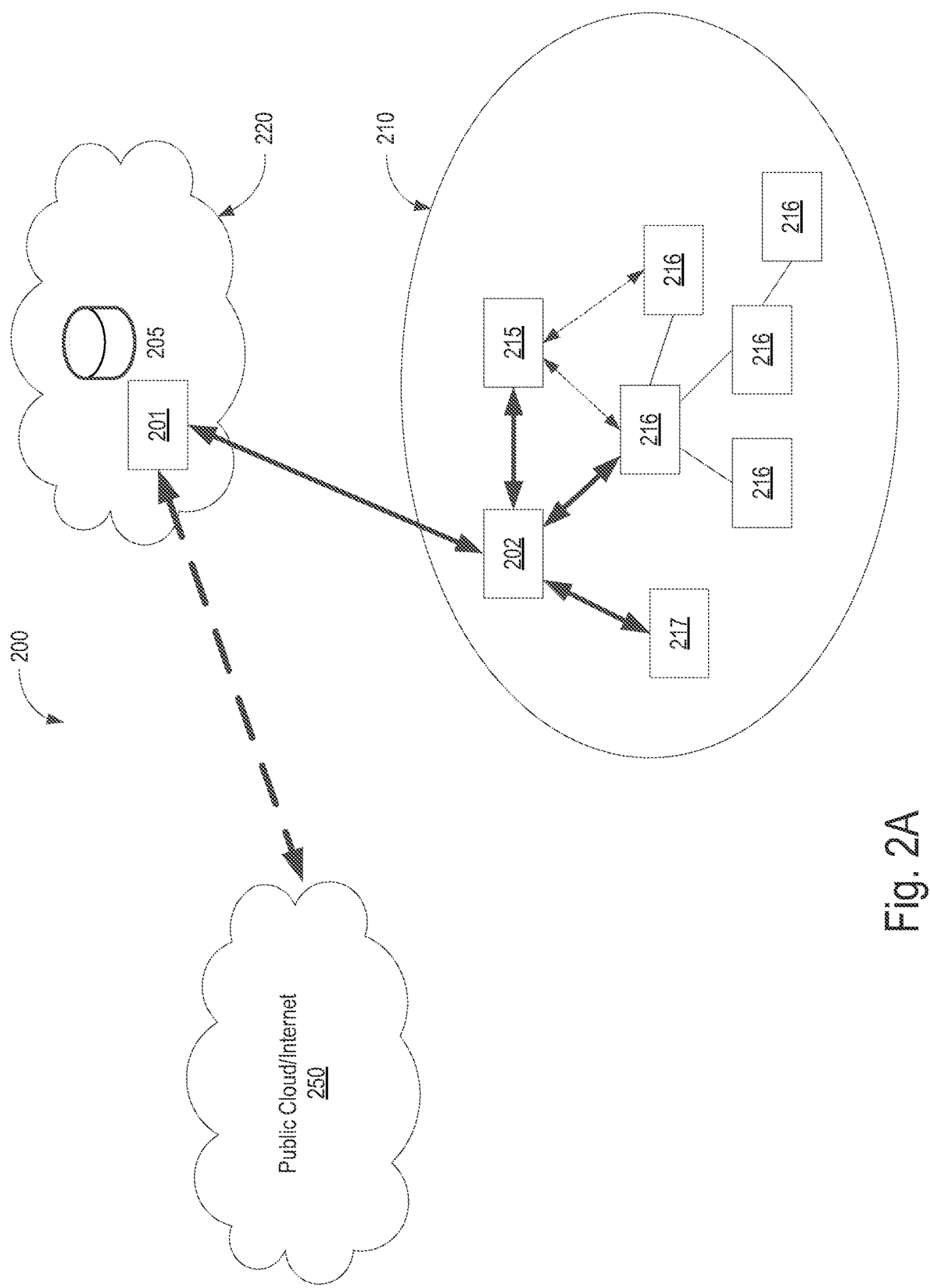
FIG. 2A illustrates system architecture of an exemplary system deployed in an enterprise network, according to one embodiment.

FIG. 2A illustrates system architecture of an exemplary system deployed in an enterprise network, according to one embodiment. The system 200 includes a manager 201 (herein also referred to as Loupe Manager) and one or more collectors 202 (herein referred to as Loupe Collectors). In one embodiment, the collector 202 is a software appliance (virtual or physical) that is located on premise. The collector 202 may be deployed as a single software element, or for scaling a cluster or several software elements. For example, the collector 202 is logic in a non-transitory computer readable memory that can be executed by a processor to perform the actions described herein. In other embodiments, the collector 202 is a combination of hardware and software.

According to some embodiments, there are multiple collectors 202 per enterprise network 210 (e.g., a campus, a data center) and multiple networks 210 and collectors 202 per customer. Moreover, the collectors 202 can be deployed behind firewalls within an enterprise network 210. This enables the collectors to easily communicate with enterprise systems on-premise and also behind the firewall to easily communicate outbound with systems off-premise.

The collector 202 receives live packets captured directly from physical and/or virtual network elements 216. The collector 202 also receives data (e.g., topology, statistics, user information, and the like) from other enterprise systems including identity management systems (e.g., active directory 217), network element controllers (e.g., SDN controllers 215, network management systems), and the like. The collector 202 also runs performance tests against on/off-premise applications in the public cloud/Internet 250 (e.g., BOX®, MICROSOFT OFFICE365®, GOOGLE®, WEBEX®, WORKDAY®, SALESFORCE®) and collects the performance results.

The collector 202 captures all of these data, extracts key metadata or features, and compresses and sends the key metadata or features to the manager 201 that is located in a public cloud 220. For example, the collector 202 receives 10s or 100s of gigabits per second of data, but only sends 10s or 100s of kilobits per second of data to the manager 201. The collector 202 is provisioned and configured by the manager 201, thus the commands from the manager 201 towards systems that are on-premise can be proxied via the collector 201. In one embodiment, the manager 201 may also be deployed in a private cloud or elsewhere within a large multi-site organization.

The manager 201 summarizes and stores the data received from the collector 202 in a database 205. The manager 201 performs additional data collection from off-premise enterprise systems and other applications over the public cloud/Internet 250 and runs its own performance test. The manager 201 applies learning and other heuristic algorithms on the data and bind higher-layer information (e.g., about users, applications, devices, and behaviors) to the data. The manager 201 also computes the crawling schedule for the collectors 202 to receive data from different parts of the network. The manager 201 is also responsible for providing a web interface and a natural language query capability to retrieve ranked answers based on the learned data. Similar to the collector 202, the manager 201 is a software appliance that can be deployed in a cluster or in multiple tiers. The manager 201 contains a database 205 that can support large data storage and efficient queries (e.g., BigTable®). Generally, there can be one manager 201 for many organizations and/or enterprises (e.g., multi-tenant style deployment), or multiple managers 201 for multiple organizations and/or enterprises. The manager 201 may also be logic in a non-transitory computer readable memory that can be executed by a processor to perform the actions described herein or a combination of hardware and software.

Figure 2B:
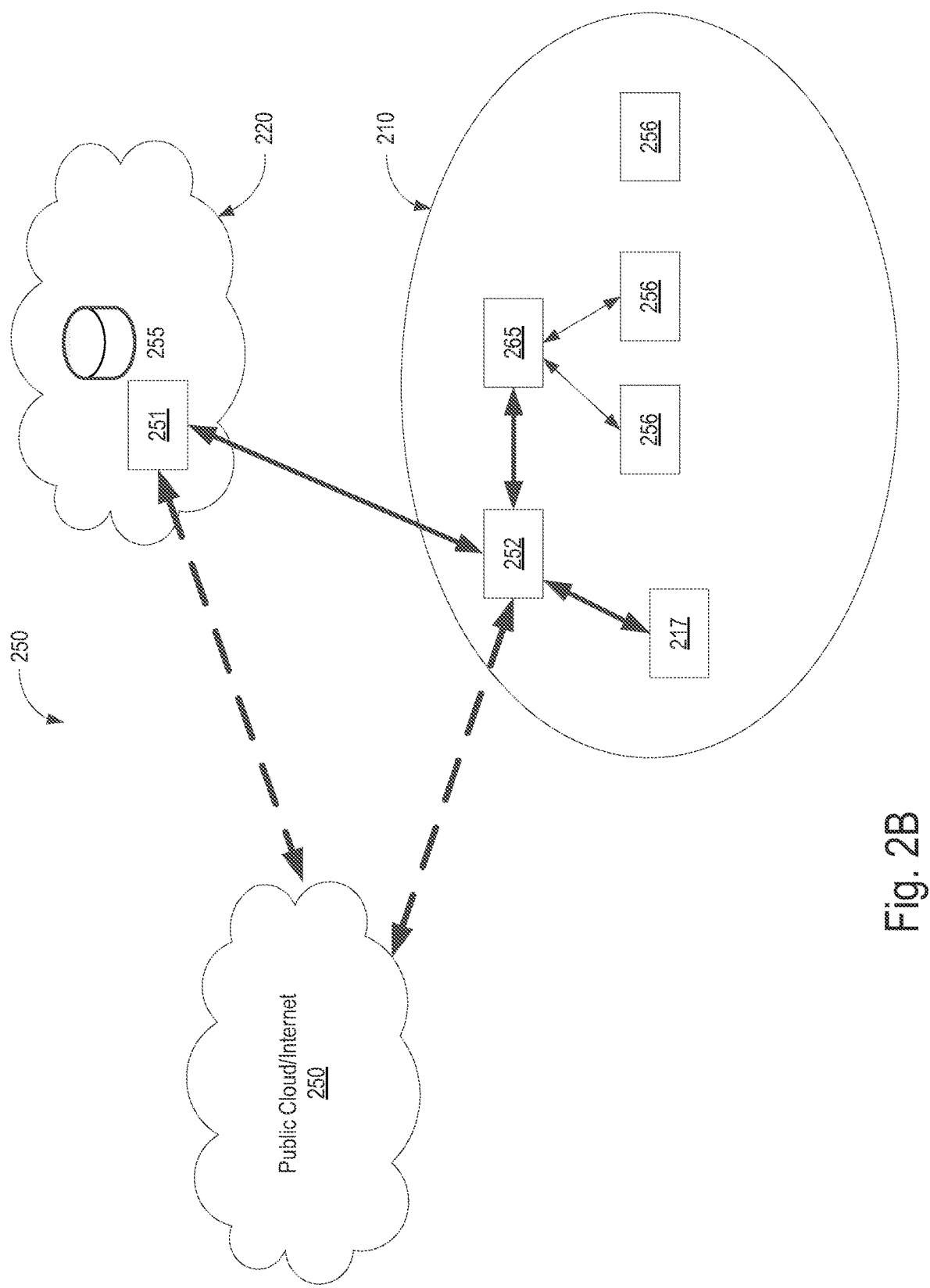
FIG. 2B illustrates system architecture of an exemplary system deployed in an enterprise network, according to another embodiment.

FIG. 2B illustrates system architecture of an exemplary system deployed in an enterprise network, according to one embodiment. The system 250 includes a manager 251, a collector 252, a wireless controller 265 that controls one or more wireless access points (APs) 256. The wireless controller 265 may take many forms, for example, (i) a separate on-premise software running on its own hardware, (ii) software that is integrated into the access points 256, or (iii) software located off-premise (e.g., in a cloud 220). The wireless controller 265 controls and/or configures the access points 256 and terminates data plane traffic coming from mobile devices that are wirelessly connected to the access points 256. The wireless controller 265 is an example of a network element, as well as a SDN controller that controls several other network elements (e.g., access points 256).

The collector 252 collects wireless metrics from the controller 265 via a management interface (e.g., simple network management protocol (SNMP), command-line interface (CLI), proprietary management protocol). Examples of these metrics for a mobile device include, but are not limited to: signal strengths, layer 2 traffic statistics (e.g., packets transmitted, retried, dropped), traffic transmission rates, device location, and user information. Examples of these metrics for an access point include, but are not limited to: channel utilization, aggregated layer 2 traffic statistics, interference measurements, CPU/memory utilization.

The collector 252 simultaneously collects metrics and other information from other enterprise systems where available, via their respective management interfaces. One example is collecting user role as well as user-to-IP address information from a directory server (e.g., LDAP, Active Directory). Another example is collecting unified communication performance metrics from a Microsoft Lync Server).

The collector 252 simultaneously sees network traffic via a mirrored interface via a logical or physical port mirror off of the wireless controller 265, or a logical or physical port mirror off of another network element (e.g., switch, router, access point) in the network where relevant user traffic is carried.

From the traffic, the collector 252 performs deep packet inspection (DPI) and extracts, in addition to general protocol level metadata, user/device quality of experience (QoE) related metadata, differing on an application-by-application basis. For example, web browsing QoE metrics include page load times and/or HTTP URL response times. Voice and video application QoE metrics involve extracting and/or computing the relevant mean opinion score (MOS) values.

According to some embodiments, the present system and method time aligns the QoE metadata with metadata extracted across the application stack including the wireless layer metrics from the wireless controller 265. For example at a particular time interval, a user/device may have poor page load times, high transmission control protocol (TCP) retransmits, low signal-to-noise ratio (SNR), high AP channel utilization. The present system and method collects and stores this time series data, and analyzes the time series data for trends/patterns over time and other dimensions (e.g., device type, location). For example, the present system and method finds that ANDROID® devices suffer consistently worse web performance than IOS® devices.

According to some embodiments, the present system and method analyzes for trends/patterns is across networks. For example, the present system and method identifies the specific network/protocol/wireless metrics to determine the application performance. As an example, the present system and method analyzes a bad Microsoft Lync® voice application performance (e.g., mean opinion score (MOS)) across many customer networks. The present system and method learns that the most important indicator is high levels of layer 2 packet retransmissions. Based on this assessment, the present system and method predicts, for a new customer network that has high levels of layer 2 packet retransmissions, that Microsoft Lync® performance would be poor unless the packet retransmissions problem is rectified.

Figure 3:
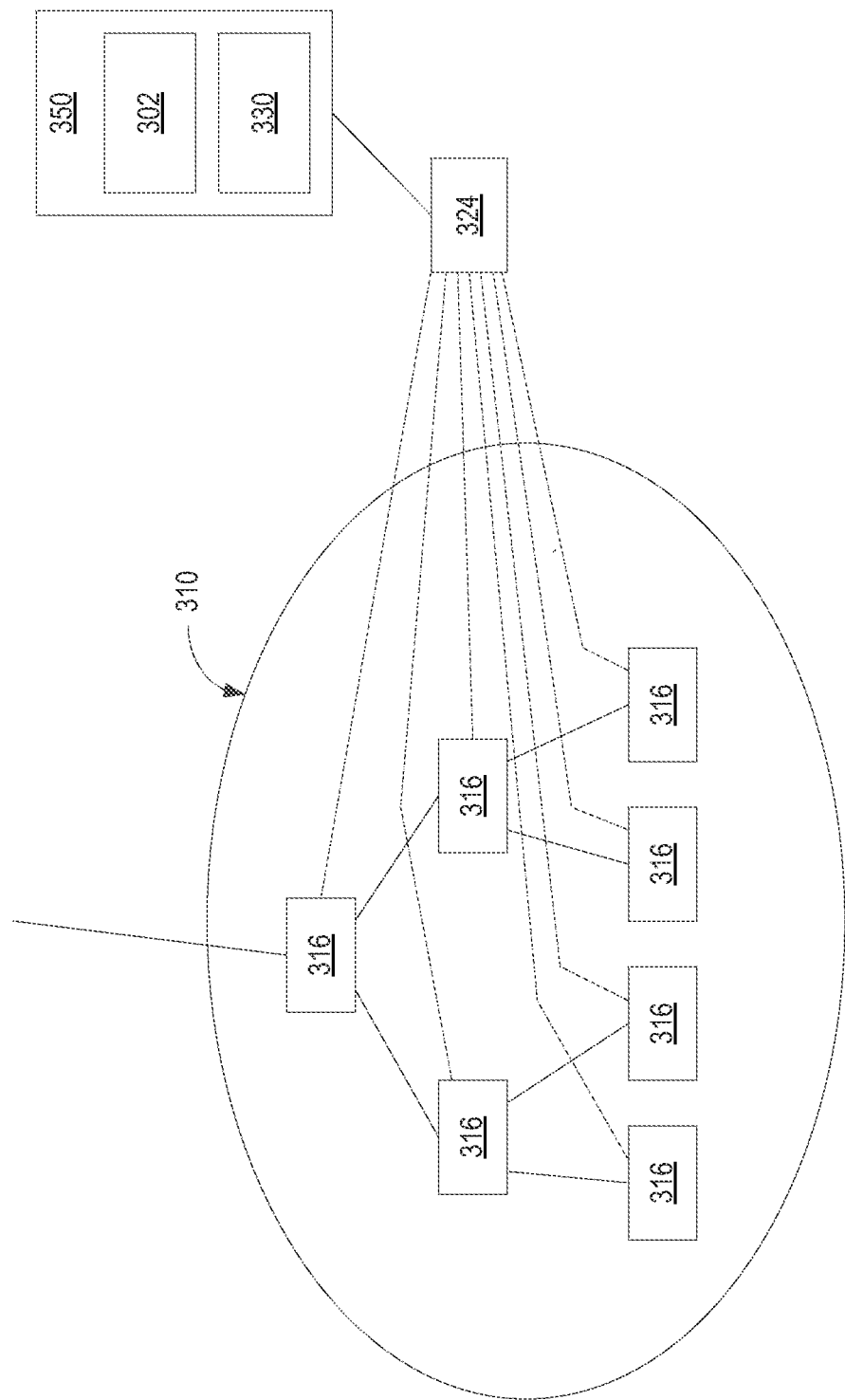
FIG. 3 is a block diagram of an out-of-band deployment, according to one embodiment.

The present system and method has applicability to two use cases: visibility and control. From an architecture perspective, there is a difference between deployment possibilities between the two use cases. In particular, for passive visibility only, the present system and method can be deployed out-of-band. FIG. 3 is a block diagram of an out-of-band deployment, according to one embodiment. A programmable (e.g., SDN-enabled) switch 324 receives mirrored traffic of network elements 316 and communicates with a server 350 including a collector 302 and a controller 330. The mirrored traffic (as indicated in dotted lines) from the network elements 316 is forced through the programmable switch 324. The programmable switch 324 can be dynamically controlled and programmed to direct specific traffic during specific time intervals and network locations to the collector 302. For example, the controller 330 controls the programmable switches 324. In a case where the total bandwidth of the traffic being monitored is less than the bandwidth of the collector 302, the programmable switch 324 may not be necessary and all mirrored traffic can be directly sent to the collector 302. An example of this case is where only the wide area network (WAN) links within an enterprise network are monitored.

Figure 4:
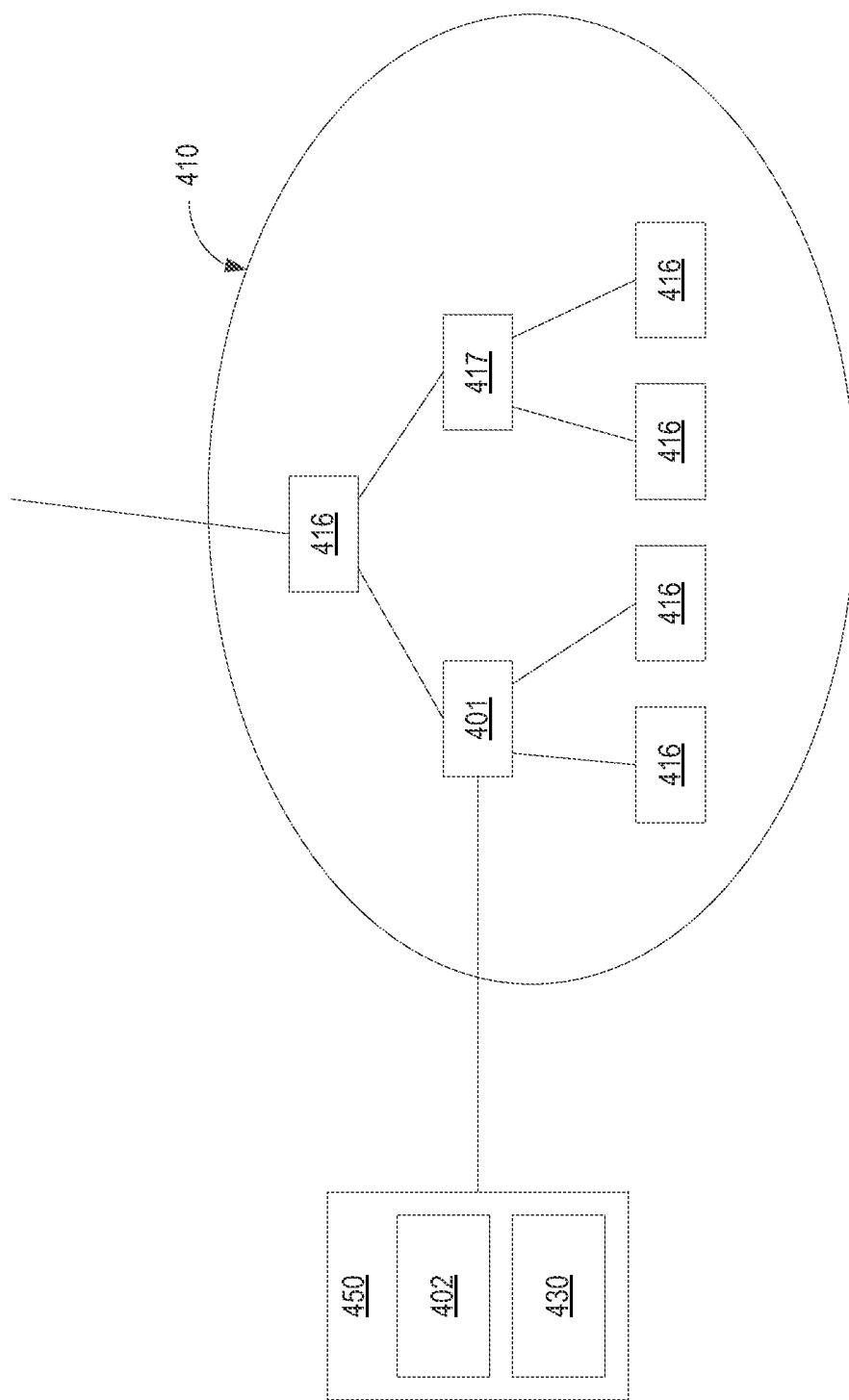
FIG. 4 is a block diagram of an inline deployment, according to one embodiment.

For control, the present system and method employs an inline deployment, according to some embodiments. In this case, a subset of the network elements carrying regular traffic (e.g., non-mirrored traffic) is programmable (e.g., SDN-enabled). Moreover, these network elements (e.g., physical and virtual switches, wireless access points) may be located such that the policy can be effective, for example, to form a physical or logical choke point. FIG. 4 is a block diagram of an inline deployment, according to one embodiment. A manager 401 receives traffic from non programmable network elements 416 and programmable network element 417 and communicates with a server 450 including a collector 402 and a controller 430. In this embodiment, the manager 401 is deployed on premise in a private cloud 410 but it is apparent that the manager 401 can be deployed off-premise in a public cloud as illustrated in FIGS. 2A and 2B.

The manager 401 located in a cloud is capable of observing across multiple customer networks. While the manager 401 (whether it is a multi-tenant manager or a separate manager per customer) may be deployed in a private or public cloud to preclude sharing of data across multiple networks, the present system and method may achieve overall performance improvement by combining trained algorithms from each of the customer networks.

Visibility

Figure 5:
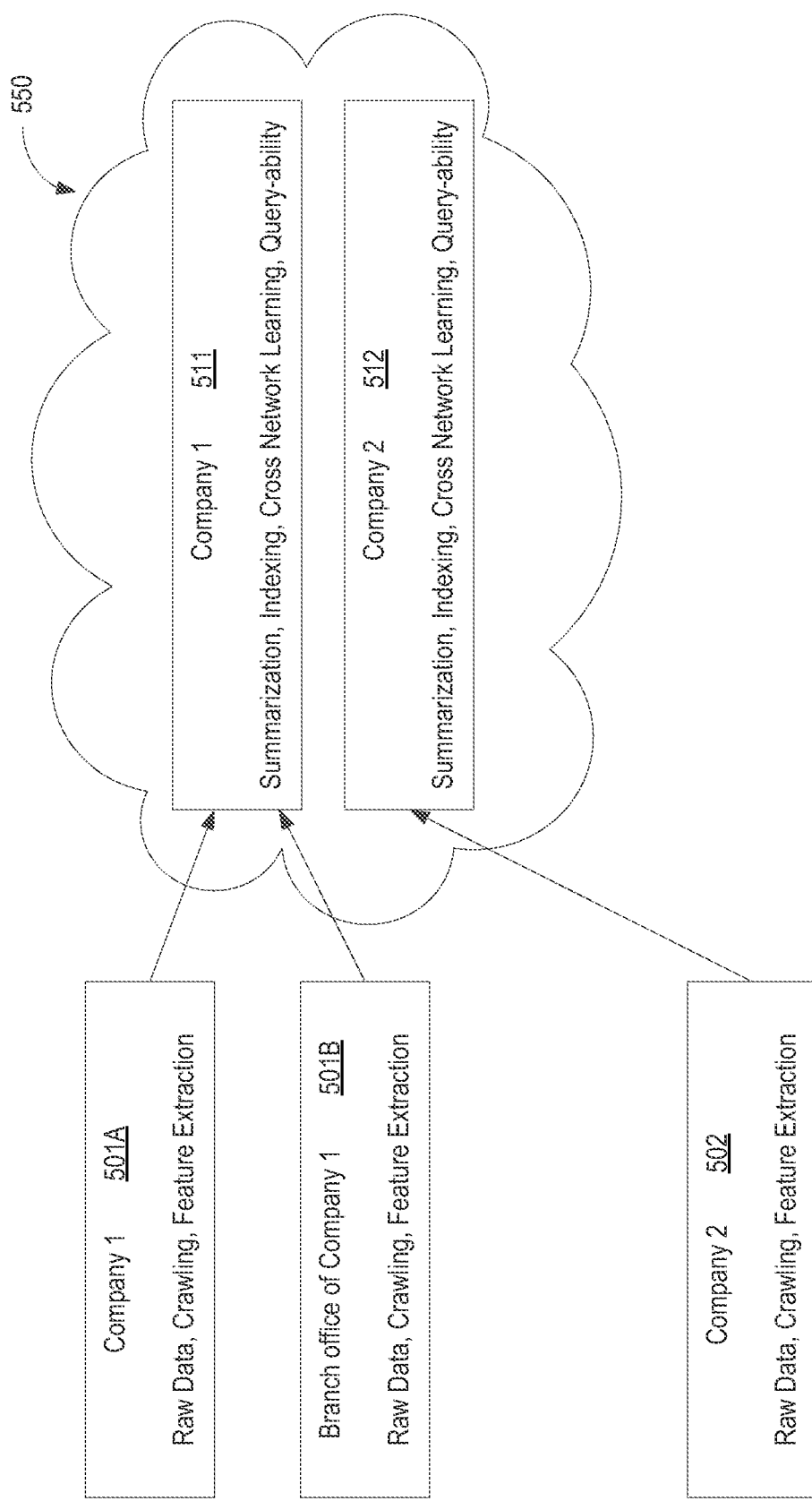
FIG. 5 is a flow diagram for providing network visibility, according to one embodiment.

The present system and method provides crawling and indexing the network and enables natural language query about the network and applications, users, devices and behaviors. The specific flow for network visibility is in the following order:
RAW DATA→CRAWLING→FEATURES EXTRACTION→SUMMARIZATION→INDEXING→CROSS-NETWORK-LEARNING→QUERY-ABILITY FIG. 5 is a flow diagram for providing network visibility, according to one embodiment. The RAW DATA CRAWLING FEATURES EXTRACTION pieces occur on premise (e.g., collectors of Company 1 (510A), a branch of Company 1 (501B), Company 2 (502)), and the SUMMARIZATION INDEXING CROSS NETWORK LEARNING QUERY-ABILITY pieces occur in a cloud 550 (e.g., managers of Company 1 (511) and Company 2 (512)). It is noted that these functionalities may be split across a manager and a collector in a variety of ways without deviating from the scope of the present disclosure. For example, partial summarization can occur in the collector as opposed to the manager.

Raw Data

The raw data includes data that can be collected or crawled by a collector or a manager. The first piece of raw data that is crawled is a live traffic on the network that can be accessed by one or more collectors. The raw data can further include statistical, topological and configuration data—received either from network elements directly, or via an intervening controller or a manager. Examples of raw data include, but are not limited to, sampled flow (sFlow®) and SNMP data harvested from network elements. Similarly, topology information can be gleaned from a SDN controller if available. Other information gleaned from other enterprise systems (on or off-premise) is also applicable, for example, user information received from an ACTIVE DIRECTORY® server.

The raw data also includes the results from pro-active performance tests with respect to on and off-premise applications. In one embodiment, the collector runs proactive performance tests (e.g., HTTP GETs, PINGs) with various target applications. These target applications can be automatically detected by the present system and method or specifically user pre-configured.

Crawling Raw Data

Crawling herein refers to an act of dynamically selecting a different set of raw data for the collectors to examine at any given time. For example, crawling includes observing different physical or virtual links, and applying different filters to the raw data.

In many cases, the total amount of traffic exceeds the bandwidth of a collector. This necessitates a device with network packet broker equivalent (NPBE) functionality that is capable of driving mirrored and filtered traffic from multiple parts of the network to the collector. The present system and method dynamically programs one or more NPBE devices with filtering and steering rules to get selected access to the data. However, the present system and method also is applicable to a case where the traffic mirrored to the collector comes from a small number of locations (e.g., mirrored traffic from WAN links), and when the total simultaneous mirrored traffic is less than the bandwidth of the collector. This case may not require a NPBE device. In one embodiment, the NPBE is one or more software elements, for example, running as part of the collector.

Crawling the raw data is a significant problem especially in situations where the present system and method can dynamically control one or more NPBEs within the network to capture packets from different parts of the network at different times. In one embodiment, a NPBE functionality is implemented by a SDN controller operating on top of a SDN-enabled switch. In this case, the manager, either directly or proxied via the collector, can command the SDN controller to have the underlying network elements to implement the NPBE functionality.

The method for controlling the network packet broker equivalent is for the manager to compute a dynamic crawling and filtering schedule that informs the NPBE on how it may steer traffic to the collector. The computation of the dynamic crawling and filtering schedule may be done in a variety of ways, for example, but not limited to, as a function of topology, computation and network resources at the collector, and statistics.

An example of a dynamic crawling and filtering schedule is:
Send all ingress and egress traffic from link e1 to the collector;
From link e2, send ingress and egress traffic with source or destination port equal to 80 to the collector; and Cycle through links e3, e4, e5 and e6, 5 minutes at a time, sending all traffic to the collector.

A dynamic crawling and filtering schedule with more complicated logic may be sent to the collectors. For example, collectors can be provisioned with a program that searches for a dynamic trigger to alter the schedule. For example, the dynamic trigger is: "if an application X is detected and is using Y bandwidth, then monitor traffic from the link more frequently." In another embodiment, the dynamic crawling and filtering schedule is computed to optimize load balancing between collectors, for example, "send the 1 GBps of traffic from link e1 to collector #1 and the 1 GBps of traffic from link e2 to collector #2."

According to one embodiment, the collector crawls performance information of on- and off-premise applications that the present system and method detects use of, or is pre-configured by a user. The performance information may be generated by the collector performing performance tests (e.g., PING, TRACEROUTE, HTTP GETs) against the applications. The performance information can be crawled by periodically running the same HTTP GETs against a target application that is pre-configured or automatically detected, and sending to the manager the detected results. The crawling schedule may include a command, for example, "if a new application is detected, then immediately start running performance tests against it."

According to some embodiments, the raw data can be collected from a SDN controller or a network management system in the following process:
  Global view of L1→L7 Network Topology,
  Port statistics for each network element, if available,
  Current Configuration of each network element under control,
  Configuration Capability of each network element under control,
  API functionality and configuration capabilities of the controller itself,
  Any higher layer information available regarding users, applications, devices, locations, and the like.

According to some embodiments, the raw data can be collected from an enterprise system (e.g., ACTIVE DIRECTORY®, light directory access protocol (LDAP) servers, single sign-on (SSO) system). Examples of such raw data include, but are not limited to, user information such as roles and associated policies, login status, IP address.

According to some embodiments, the raw data can be collected from network elements directly (e.g., by way of a priori instructions given to a SDN controller) in the following process:
  Sampled mirrored traffic from various ports in the network,
  Advanced statistics such as sFlow®, netFlow®,
  Previously computed information regarding users, applications, devices, locations, and
  Signal strength, error-rate, and other performance related information.

According to some embodiments, the raw data can be collected from the present system or other policy engine such as desired high level policies. According to some embodiments Performance data generated by the collector including results of proactive tests (e.g., PING, HTTP, TCP) performed by the collector on detected or user pre-configured on/off premise applications.

Figure 6:
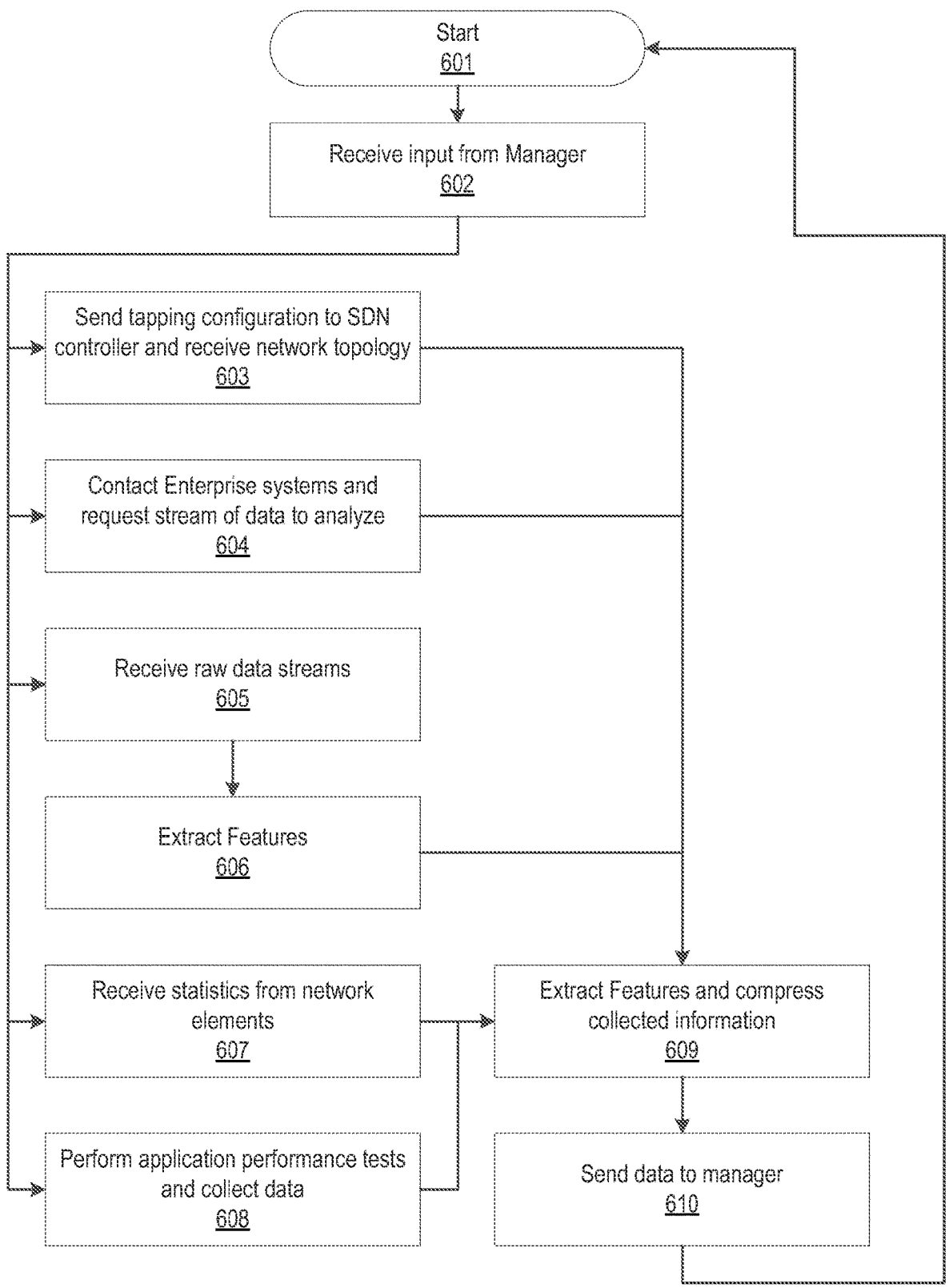
FIG. 6 is a flow diagram of an input collection process at the collector, according to one embodiment.

FIG. 6 is a flow diagram of an input collection process at the collector, according to one embodiment. The input collection process starts (at 610) and a collector receives inputs from a manager (at 602). Examples of inputs include, but are not limited to:
  instructions on which enterprise systems to collect data from and how to collect the data (e.g., IP address, credentials),
  sampling schedule for data collection from network elements,
  instructions on initial analysis, filtering, and compression of collected data, and
  list of applications to run performance test.

The collector further sends desired tapping configuration to the SDN controller and receives network topology (at 603), contacts the enterprise system and requests a stream of data to analyze (at 604), receives sampled raw data streams identified by time and link (at 605) and extracts features from the received sampled raw data streams per instructions (at 606), receives advanced statistics from network elements (at 607), and performs application performance tests and collects data (at 608). The controller further extracts features using information collected from 603-608 and compresses collected information (at 609). The controller sends data to the manager (at 610), and repeats the input collection process.

Feature Extraction

According to one embodiment, the present system and method extracts key features and/or metadata from the crawled data. For example, packets are streaming into the collector at multiple gigabits per second speeds. The collector extracts a set of features on a flow-by-flow, or a host-by-host basis from millions of packets per seconds and tens of thousands of flows per second, and sends the extracted data to the manager in less than a few hundred bytes per second per flow. In one embodiment, a flow is defined by the 5-tuple of (srcIP, dstIP, srcPort, dstPort, protocol). The definition of a flow may be expanded to apply to other primitives such as application or other combinations of packet header fields (e.g., Layer 2 flows include source and destination media access control (MAC) addresses in the definition of a flow).

Examples of a flow-by-flow feature include, but are not limited to:
  Number of different HTTP2xx RESPONSE packets
  Number of different HTTP3xx RESPONSE packets
  Number of different HTTP5xx RESPONSE packets
    Binary feature of whether IP Traffic is present
  Number of different types of HTTP packets
  Number of different types of DNS packets
  Number of different types of DHCP packets
  Binary feature of whether TCP_SYN was followed by TCP_SYN_ACK
  Binary feature of whether DNS_Q was followed by DNS_SUCC_RESP
  Binary feature of whether DHCP_REQUEST was followed by DHCP_GRANT
  Set of source/destination MAC addresses present in the flow
  Each of the above features on a time slice by time slice basis (e.g., every 10 seconds of a flow)
  Mean, median and variance of packet inter-arrival times, payload sizes
  Flag indicating whether window scaling was requested
  Number of TCP FIN packets seen Examples of a host-by-host feature include, but are not limited to:

Number of different hosts a particular host interacts with
Set of hosts that interact with each other
Number of ports used for transactions (indicates server vs. client)
Examples of application-level metadata include, but are not limited to:
HTTP response and page load times
Voice and video call MOS scores
Response times of other protocols (DNS, DHCP, RADIUS, etc.)

Small raw data (e.g., statistics, topology) can be compressed and sent to the manager. However, intelligent feature extraction is required to send a large data to the manager. An example of a large data is statistical data (e.g., average link utilization). Similarly, the performance test results might be reduced down to specific features (e.g., average HTTP response time, presence of an anomaly in the performance test).

Examples

Figure 7:
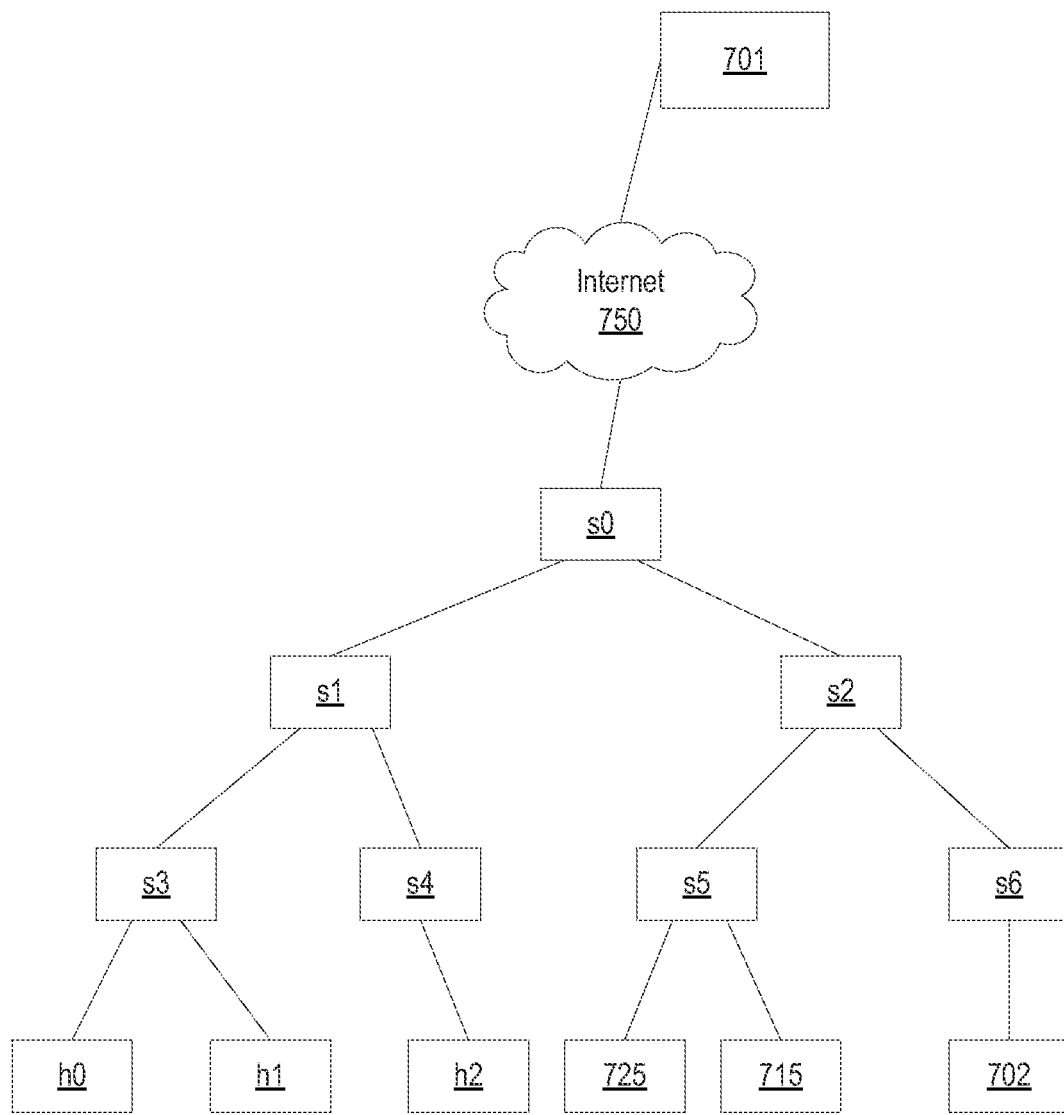
FIG. 7 illustrates a diagram of an exemplary SDN enabled network, according to one embodiment.

FIG. 7 illustrates a diagram of an exemplary SDN enabled network, according to one embodiment. Seven switches s0-s6 and network elements h0-h2 are arranged hierarchically. The top switch s0 is connected to the Internet 750, and a manager 701 is deployed in a server in the public cloud and connected via the Internet 750. A collector 702 is deployed as a virtual machine (VM) on a server attached to switch s6. The switches s0-s6 are SDN enabled switches and a SDN controller 715 is deployed as a server attached to switch s5. An active directory server 725 is also connected to switch s5.

Figure 8:
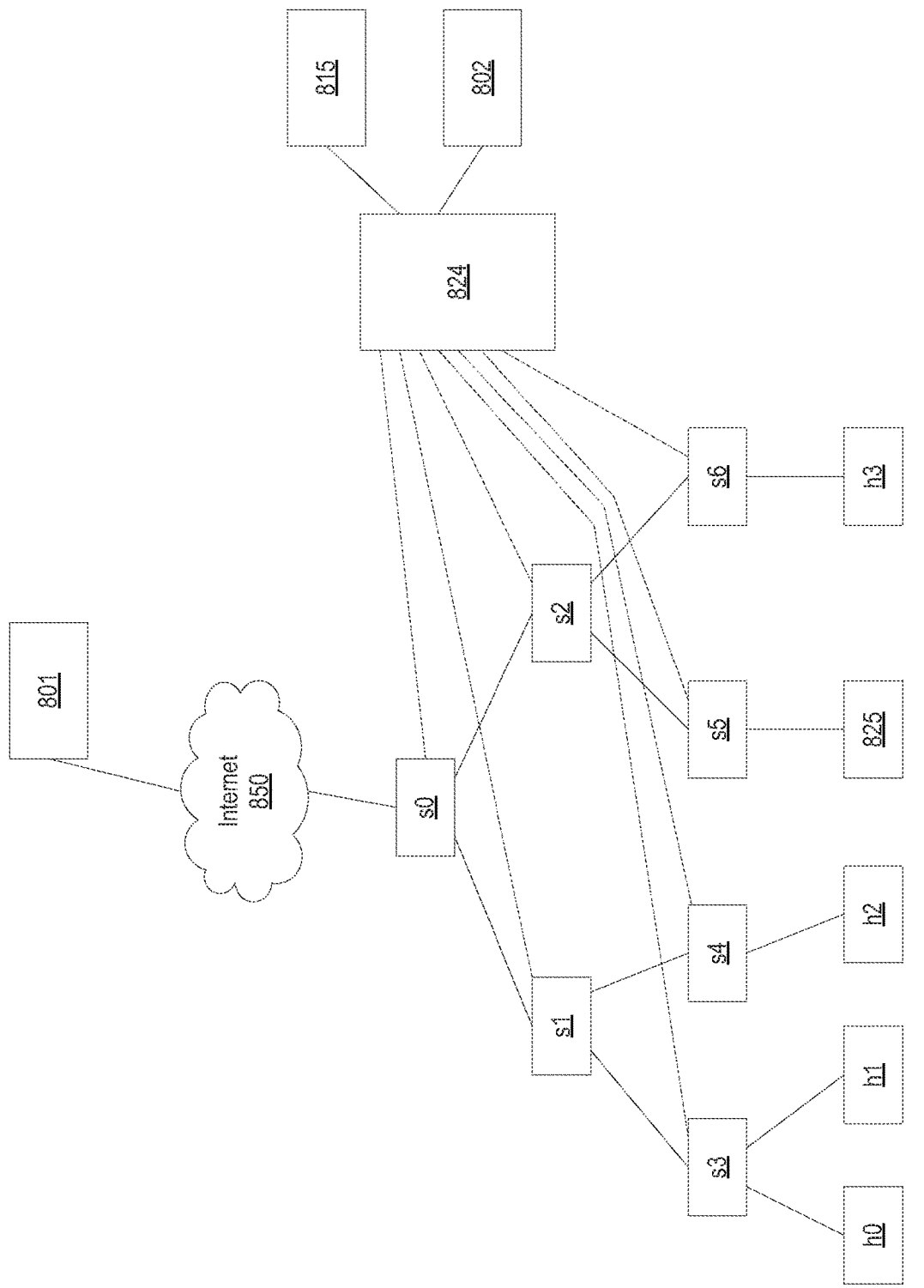
FIG. 8 illustrates a diagram of an exemplary of legacy network including a SDN-enabled switch, according to one embodiment.

FIG. 8 illustrates a diagram of an exemplary of legacy network including a SDN-enabled switch, according to one embodiment. Seven switches s0-s6 feed mirrored traffic (as indicated by dotted lines) into a SDN-enabled switch 824. The mirroring configuration is static, and as an example may simply mirror the traffic from each switch's uplink. The collector 802 and SDN controller 815 are deployed connected to ports connected to the SDN-enabled switch 824. The manager 801 is deployed in a server in the public cloud and connected to the switch s0 over the Internet 850. An active directory server 825 is also connected to switch s5. It is noted that mirror ports can be manually configured without the presence of a SDN enabled switch.

The collector 802 dynamically captures packets from multiple links in the network. As an example, the link to the collector is a 2 GBps link (e.g., 2 link-aggregated IGBps links), and other links (including the WAN link) are IGBps links. In this case, the manager may send a crawl schedule to the collector, for example:
Collect the features on the WAN link (e0) 100% of the time, and
Continuously cycle through links e3, e4, e5, e6 (i.e., certain of the depicted links) for five minute stretches, and collect all the features during that time.

Summarization and Indexing

Summarization and indexing functionalities are implemented in a manager although it is possible to embed some or all of this functionality in a collector as well. The summarization and indexing processes take input features and other relevant data from the collector(s) and other systems. The first outputs of the summarization and indexing processes are higher layer inferences, or bindings. Specifically, the relationship or binding of higher layer data (e.g., users, applications, devices) to lower layer data (e.g., IP and MAC addresses, ports) is computed and indexed in a database. The present system and method provides a capability to query using natural language and high-layer control primitives, and any high-level indexed information, both current and historical.

The lower layer data may vary depending on an objective such as network visibility or network control. For network visibility, the lower layer data includes, but is not limited to, protocol level metrics and metadata. For network control, the lower layer data includes, but is not limited to, control primitives such as ports, MAC addresses, IP addresses, an access control list (ACL), quality of service (QoS), and rate limit setting. According to one embodiment, the present system and method predicts performance of one or more of an application, a user, and a device based on observed characteristics of the network around network protocol level metrics and metadata.

Figure 9:
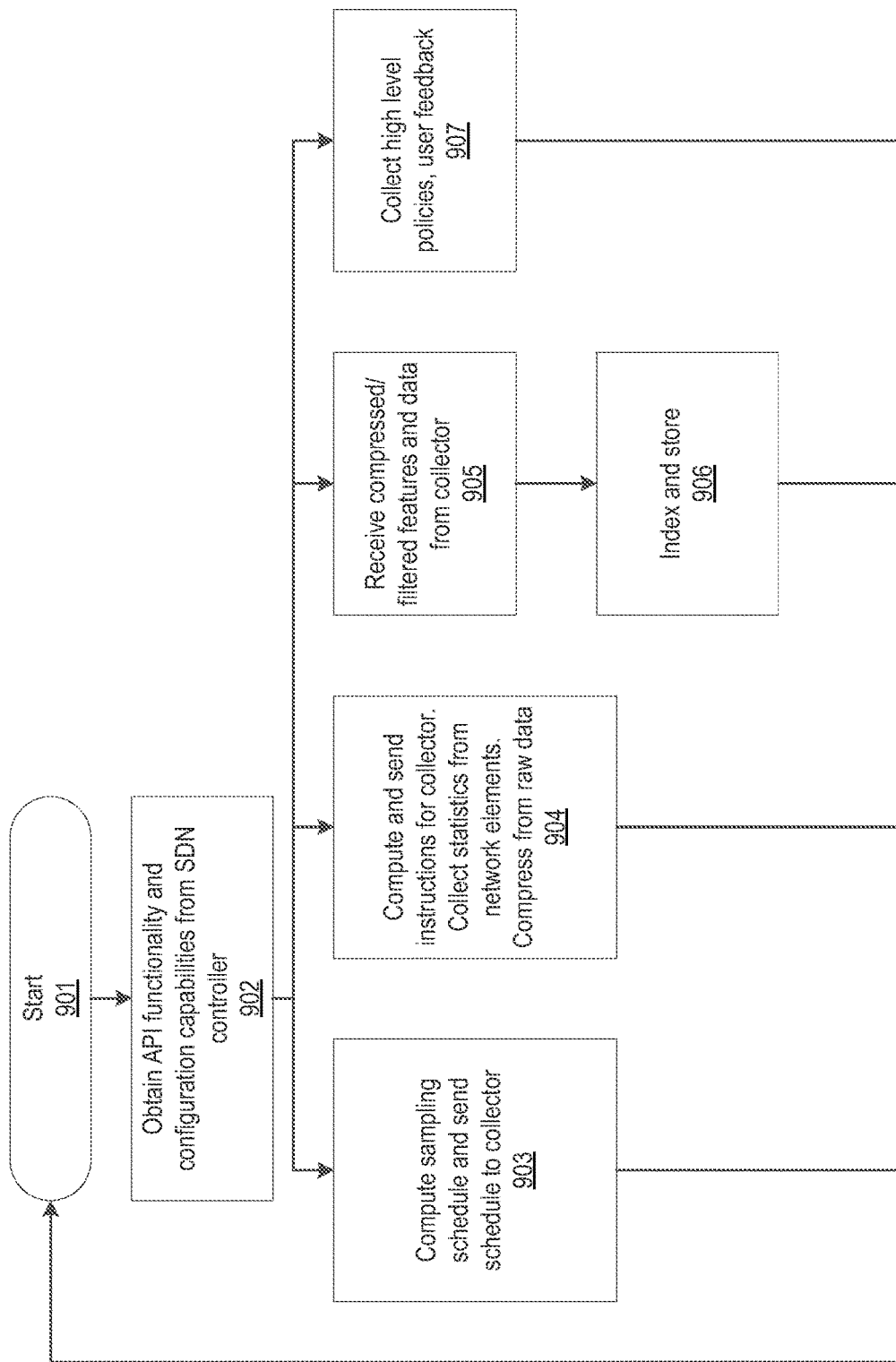
FIG. 9 is a flow diagram of an exemplary information collection process, according to one embodiment.

The main role of the summarization process is to store and learn from the inputs received from the collector(s) and other enterprise systems. FIG. 9 is a flow diagram of an exemplary information collection process, according to one embodiment. The collection process starts (at 901) as a manager obtains API functionality and configuration capabilities from a SDN controller (at 902). The manager computes a sampling schedule as a function of a desired performance objective and topology and sends the sampling schedule to the collector (at 903). The manager also computes and sends instruction for the collector to interact with the SDN controller, other enterprise systems, collect advanced statistics from network elements, and determines how to analyze, filter, and compress from raw data (at 904). The manager also receives raw compressed, filtered features, and other data from the collector (at 905), and indexes and stores the received raw features and data in a database in terms of using time, link and other aspects such as source IP address, as keys (at 906). The manager also collects high-level policies from user via a user interface and other policy engines, and user feedback to aid and improve a learning algorithm (at 907).

From the set of input features and relevant input data, the present system and method uses two background processes to summarize (i.e., extract higher-layer information) and index the summarized data. The incremental process acts upon the reception of any new raw (i.e., un-summarized) feature data or any data update that causes previously indexed information to be immediately erroneous (e.g., a user changed IP address). This process runs a heuristic classification algorithm to summarize the raw features. The second process is a global process that runs periodically to update a learning model (e.g., re-training the classification algorithm), as well as re-summarize past data. Examples of the higher layer information include, but are not limited to:
Users;
Applications;
Protocols;
Device;
Content;
Network and Physical Location (Telemetry); and
Derived metadata, including:
Learned relationships between the above (e.g., User X tend to access applications of type Y, tend to generate Z amount of traffic),
Learned attributes of the above (e.g., rate of change vs. "stickiness" of the relationships), Learned behaviors about the above (e.g., this application appears to be having TCP issues, this user appears to be doing something malicious), and Learned changes in behavior of the above (e.g., this application has had an abnormally high set of errors, this application is using abnormally high bandwidth).

The summarization and indexing de-duplicates data. For example, if multiple collectors send the same data, and the manager recognizes the duplication of data and disambiguates. In another example, if multiple collectors see the same information from the same enterprise system, the manager recognizes the duplicate information and disambiguates.

Figure 10:
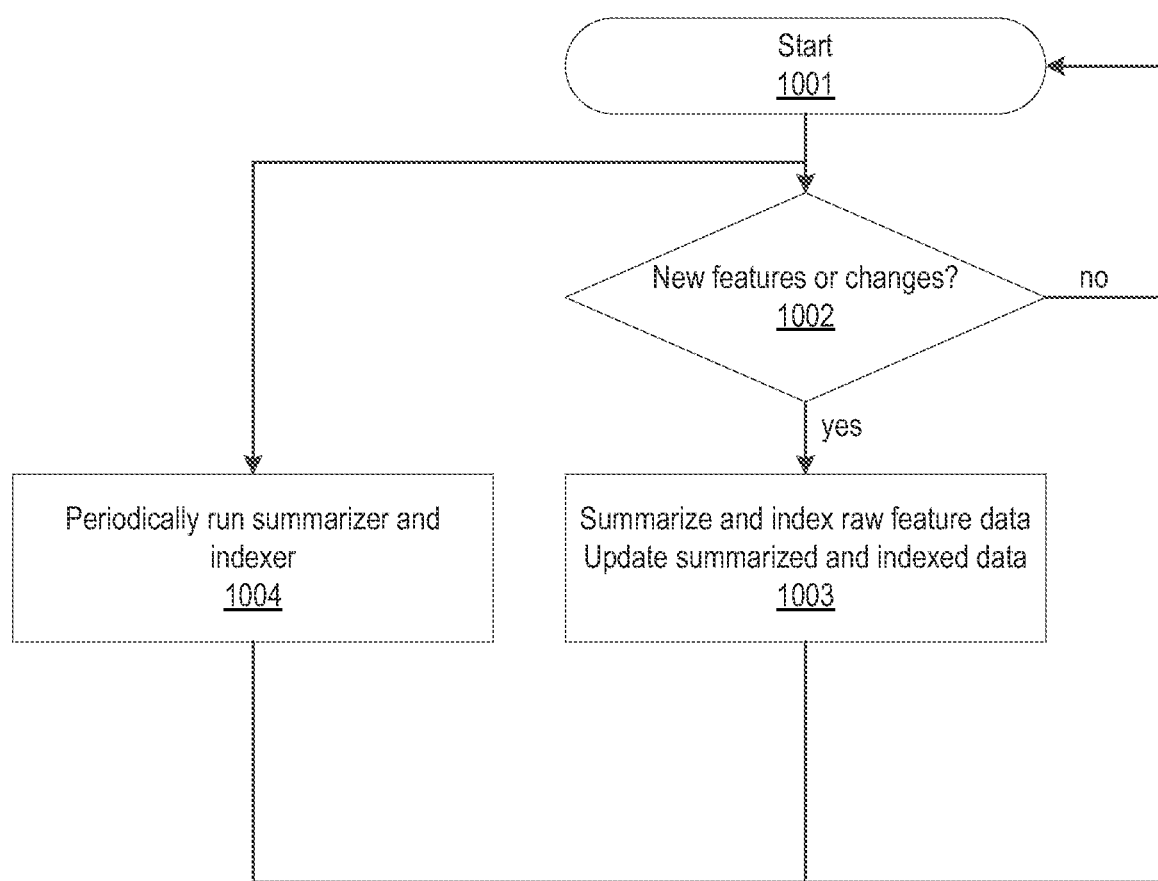
FIG. 10 is a flow diagram of summarization and indexing processes, according to one embodiment.

FIG. 10 is a flow diagram of summarization and indexing processes, according to one embodiment. The summarization and indexing process starts (at 1001) and the manager determines whether a new feature is received or there is a chance in network topology, statistics, and user information (at 1001). The manager runs incremental algorithm to summarize and index any raw feature data, runs re-indexer to update previously summarized and indexed data with changes of user or topology information (at 1003). A combination of processes is used to compute a higher-layer binding. The manager periodically (e.g., once per day) runs a global re-summarizer and re-indexer (at 1004). For example, the collector performs a deep packet inspection (DPI) to identify unencrypted application traffic, and the identified application is sent as a feature. Alternatively, the machine learning at the manager based on characterizing applications by the flow or host features described earlier can be used for encrypted traffic. User information and device information can be gleaned by accessing other enterprise systems such as active directory, extracting key information from packets (e.g., user agent string, organizationally unique identifier (OUI)), or examining network-topology (e.g., wireless traffic comes from where the wireless access points are located).

Another example concerns detecting application behaviors. For example, the machine learning at the manager can identify that the presence of certain packets (e.g., HTTP error packets) indicate certain types of errors. Similarly, a heuristic algorithm that takes into account the exact physical path the traffic takes can reveal other application behaviors. For example, packets are seen with increasing inter-arrival times as they pass through a particular switch; this indicates a congested or misconfigured switch. An example of the outputs of the heuristic algorithm is a probabilistically ranked list of higher layer bindings.

According to one embodiment, training data is collected via user's labelling of data. For example, a user, via a cloud portal, specifies a particular user or application issue occurred recently. In another example, when the present system and method suggests a set of possibilities for a given query. The user specifying which, if any, of those possibilities is the correct one is a useful training data. Further generalizing this, the present system and method combines algorithm insights from multiple networks to further enhance the classification of the collected data.

According to another embodiment, the present system and method performs, in real time, a segment-by-segment analysis of a particular user/application/device's traffic. To do this, the present system computes the physical and logical links that the traffic of interest is taking, and alters the tapping schedule of the collector(s) so that they collect data (e.g., packets, stats) pertaining to the physical links. Finally, the resultant features are indexed and analyzed in a similar vein to normally collected features.

Another example of summarization and indexing is computing composite metrics from the raw features and computing and storing comparisons of these metrics across different dimensions. For example, the present system and method computes a device quality-of-experience metric from raw measures of response times, packet loss, etc. and compares the value of that metric against devices of the same or different type (e.g., iPhones), those with the same or different operating system (e.g., Android), those connected to the same access point, etc. The computed, stored and indexed information can be quickly retrieved via a user interface query. It can also be used for a closed loop control with a programmable controller. The programmable controller controls network elements. The network manager controls the network elements via the programmable controller.

Cross Network Learning

The manager located in the cloud has access to systems from multiple enterprises. For example, the present system is deployed as a multi-tenant system across customers. In such a deployment, no data is shared across customers, but the processes may be shared across customers.

An example of cross network learning is to train separate classifiers for computing higher-layer bindings from the extracted features of separate customer networks. The separate classifiers can be combined to come up with an overall better classification (e.g., majority wins). Another example of cross network learning is learning the most common queries across networks and dedicating a higher compute power to have a better answer for those particular queries.

Another example of cross-network learning is based on different system deployments that interact with each other. For example, the present system is deployed at customer network 1 and customer network 2 that send a lot of traffic to each other. The present system and method automatically detects the heavy traffic, and runs a more advanced performance testing algorithm directly between the collectors on both customer networks.

Another example of cross-network learning is for predicting higher-layer performance based on observed lower-layer characteristics of the network and applications. For example, suppose that on one network, the present system learned that high AP channel utilization results in a jitter resulting in poor real-time video application performance. The present system detects the presence of high AP channel utilizations to predict poor performance for another network that may or may not have yet deployed a real-time video application.

Query-Ability

According to one embodiment, the present system and method provides natural language query-ability of the network. The manager has a query box that takes natural language type input regarding the network and its users/applications/devices/behaviors. Examples of natural language queries are:

"User X is having problem Y with application Z,"

"User X is experiencing slowness with salesforce.com," and

"Tell me about the SAP application."

The present system and method responds to the queries and presents a probabilistically ranked list of answers, along with the probabilities/confidence for each answer. The present system and method also presents deeper supporting evidence if requested by the user.

SUMMARY AND EXAMPLE

The manager receives feature data from one or more collectors at various levels, for example, a flow-level, host-level, user-level, and link-level. The manager collects and indexes the collected data in terms of flow, host, user, link, and time intervals. As a flow of feature data arrives, the manager runs an incremental process to classify (a) an application that the flow corresponds to, (b) any interesting behaviors that the application underwent (e.g., failure to connect to a server, slow, errors), (c) a user involved in using the application, and (d) the devices involved in using the application. Additionally, the manager ties topology knowledge to an application (e.g., the location of an application server, network links that the application traffic traverses). This information is indexed along with each feature. The collector automatically runs performance tests on detected or configured application servers, for example, running ping tests to the application servers. The performance test results are also indexed along with the applications and features.

According to one embodiment, the present system and method provides a query interface (e.g., web interface) to a user. The user enters a query, for example, in a natural language form, into the user interface of the present system. For example, a user's query is "tell me about application X." The present system proceeds to perform the following steps:

i. Query the indexed database for (a) the location of the application (e.g., on-premise, in a cloud), (b) users who were using the application over the last few hours, (c) the behaviors of the application, (d) the bandwidth that the application was using.

ii. Display the results of (i).

iii. Compute the links that have carried the application traffic over the last day. Send a command to the collector to immediately collect a ten-second sample of all traffic on all of the links. Send commands to the programmable network element (e.g., via a SDN controller) to forward the traffic from the links to the collector.

iv. Augment the previously displayed results with those found in (iii).

Another sample query may state, "user X is having problem Y with application Z" (i.e., tell me about it). The manager proceeds to perform the following steps:

i. Query the indexed database for flow instances where user X was using application Y. Of the behaviors recorded, rank-order the potential problem behaviors. Compare the corresponding features across links along network paths. Compare the features across time (i.e., historically).

ii. Display (i).

iii. Compute the links that have carried this user's application traffic over the last day. Send a command to the collector to immediately collect a ten-second sample of all traffic on all of these links Send commands to the programmable network element (e.g., via a SDN controller) to forward the traffic from those links to the collector.

iv. Augment the previously displayed results with those found in (iii).

Control

According to some embodiments, the present system and method involves using the visibility of the network and controlling the network. An example of controlling the network is enforcing a higher-layer policy throughout the network. Another example is automatic problem and security/anomaly/performance remediation where applicable. The present system and method may implement a network control in (a) a manual, or prescribed control, and (b) an automatic closed loop control. In both cases, one of the distinctions from the visibility perspective is that the binding of a higher layer policy or a control objective needs to be tracked to the specific low layer control primitives that the underlying network elements can be programmed with. Examples of the high-level control objectives include, but are not limited to:

Block user X from accessing the network,
Maintain high performance for Application Y,
Detect and mitigate denial of service (DOS) attacks, and
Prioritize user class Z traffic.

For a manual/prescribed control, the control instructions that achieve a high level objective are computed and presented to the user, but not automatically programmed into the network elements. In addition, specific network elements that require a new or updated configuration based on the control instructions are computed as a function of network topology and presented to the user. The present system computes how the control is to be achieved in a distributed manner. The control instruction sets may be probabilistically ranked in the order of predicted effectiveness. While an explicit machine-to-machine programmability (e.g., SDN controller) may not be required in some embodiments, it may be required for the present system to discover the configuration state and capabilities of the various network elements in other embodiments. The present system takes into account specific low level control primitives that the network elements can be configured with. For example, many network elements have IP, MAC, and TCAM hardware tables of different sizes that are programmable with different primitives.

According to some embodiments, the present system and method dynamically tracks the bindings between user and (IP address, MAC address, physical port) as a user changes devices, plugs into a different sub-network, and receives a new IP address from a dynamic host configuration protocol (DHCP) server. According to some embodiments, the present system and method binds an application/network performance issue to specific traffic forwarding decisions (e.g., application slowness is caused by a set of particular source/destination IP address pairs that are highly utilizing a particular link) or a network configuration (e.g., a misconfigured maximum transmission unit (MTU)). According to some embodiments, the present system and method ties a particular anomalous traffic behavior to a specific user/application/device, and further to particular IP/MAC addresses.

According to some embodiments, the present system and method takes into account the topology and capabilities of the underlying network hardware. For example, if one is trying to use a pure layer 2 switch to enforce a user policy, it would be required to dynamically track the User MAC address binding, and use only MAC addresses for programming rules into the switch. An example of taking the topology into account, the present system and method tries to enforce a policy as close to the edge of the network as possible, which current firewalls, usually deployed inline at logical or physical network choke points, cannot do. The rules programmed to the network elements can be changed in a closed loop manner when the higher-layer to lower-layer bindings change.

Figure 11:
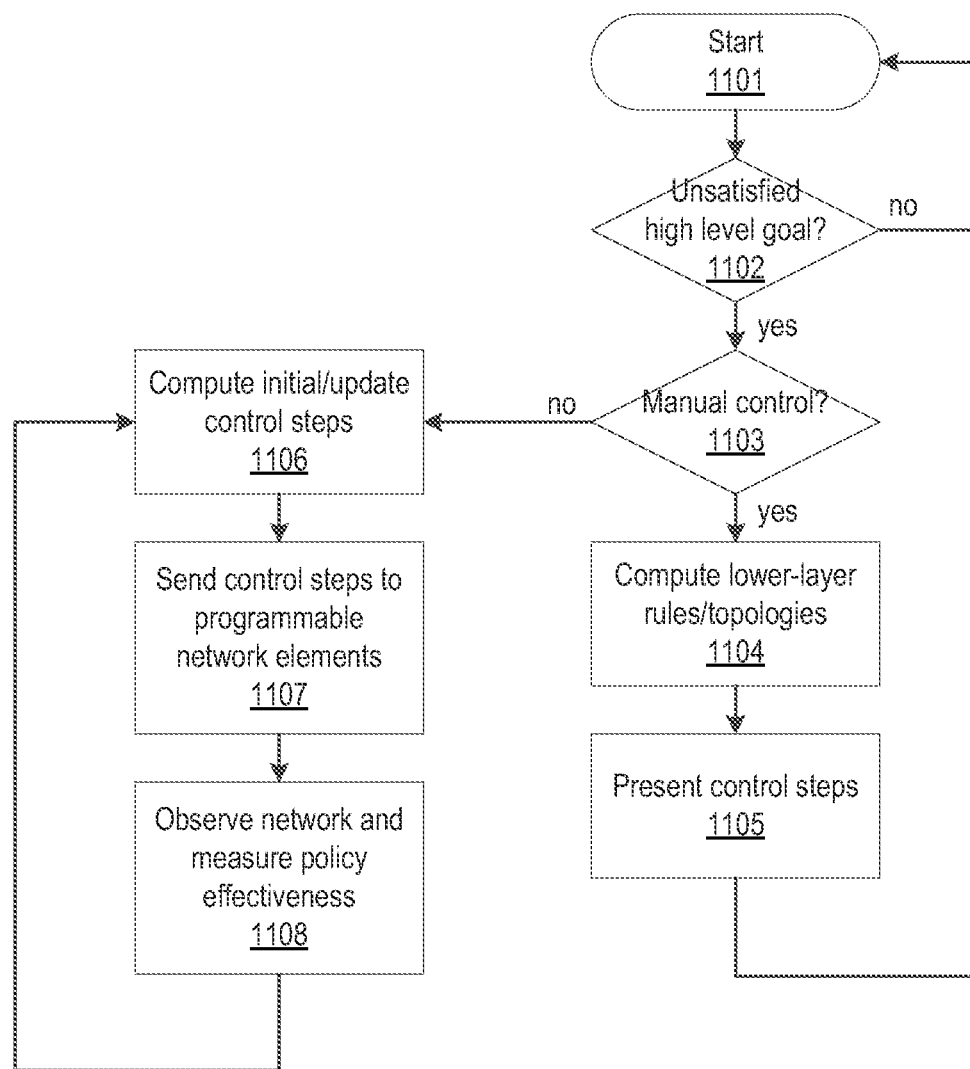
FIG. 11 is a flow diagram of a control loop, according to one embodiment.

FIG. 11 is a flow diagram of a control loop, according to one embodiment. The control loop starts (at 1101), and the manager determines whether there are unsatisfied high-level control objective (at 1102). The manager branches off based on a control method (at 1103). For a manual control method, the manager computes the optimized lower-level rules and topologies to send to the network controller base on, but not limited to, 1) the high-level control objective, 2) estimated higher layer bindings values and associated uncertainties, 3)

configuration capability and current configuration of underlying network elements, and 4) other information such as network topology, statistics, tolerable configuration changes (at 1104). The manager presents the control method of specific network elements to achieve the high-level control objective to the user (at 1105). For an automatic control, the manager computes the initial update control to the programmable network elements based on, but not limited to, 1) the high-level policies, problems, security requirements, anomalies, 2) estimated higher layer parameter values and associated uncertainties, 3) configuration capability and current configuration of underlying network elements, 4) other information such as network topology, statistics, tolerable configuration change, 5) measurement of effectiveness of the control policy, and 6) control loop parameters such as stability, oscillation, timescale (at 1106). The manager sends the control policy parameters to the programmable network elements (at 1107), and observes the network and measures effectiveness of the control policy with respect to the high-level policy (at 1108).

As an example of manual/prescribed control, the present system and method enforces a high level objective of blocking user X from the network. To do this, the present system and method first derives the IP addresses that user X corresponds to. Then, the present system and method computes a logical choke point to apply the policy effectively. For example, the logical choke point corresponds to the routers on the subnets of user X's IP address. The output of the present system includes a set of commands at each of the routers that results in the traffic from/to those IP addresses being dropped. An alternative output is a set of commands to a SDN controller to implement a desired control.

For an automatic control, the present system and method programs the network elements in a closed loop manner to achieve and maintain a high-level control objective. The automatic control is based on an inherent assumption that the underlying network has programmable (e.g., SDN-enabled) network elements. In addition to the binding of higher-layer objectives to low-layer programmable primitives and taking into account the configuration state and capabilities of the underlying network elements, the present system and method computes a dynamic control loop. The present system and method first applies a possible control (e.g., a gain) and checks to see if a high-level objective is achieved. If so, the present system and method backs off the remediation and/or applies a different but lighter remediation and checks again to see if the high-level objective is still achieved. If not, the present system and method attempts to apply a heavier control and/or re-diagnose the higher-layer objective to low layer control primitives binding and apply a different control. This procedure is also depicted in FIG. 11. The first step of the closed loop control may be different from the steps provided by the manual control. Additionally, factors such as stability, oscillation and timescale of response may be taken into account in the setup of the control loop.

The automatic closed loop control can be applied to the example of blocking user X from the network. In this example, the present system and method programs rules to drop traffic from/to user X's IP address(es) at the routers in the network. Assuming that works, the present system and method tries to program only user X's default gateway router with a rule. If it fails, the present system and method applies more rules to other routers as well as and/or blocks certain ports and continues. When the user X comes in on new IP address(es), the present system and method automatically adjusts to the changed network topology.

Another use case of an automatic closed loop control is where the control objective is to maintain high performance for application X. In this case, the present system and method simply programs rules that place all traffic corresponding to that application into the highest performing queue. If improved application X performance is not observer, the present system and method attempts to program rules that re-routes or rate-limits traffic from applications that share common network links with application X. If improvements are observed, the present system and method restores the performance of other applications.

An example of a higher layer policy (for manual or automatic control) is "Prioritize traffic from employees using business applications such as Salesforce.com or Workday, over casual traffic such as traffic from guest users using a different set of applications." To implement this higher layer policy, the present system and method dynamically tracks the session 5-tuples for these combinations, and computes a minimal set of rules necessary for the enforcement, and dynamically tracks and programs.

According to some embodiments, the present system and method automatically provides remedies to network problems. For example, a user enters in a query of the form "user X is having problem Y with application Z," and the present system and method provides the top-ranked answer (i.e., the answer with confidence greater than a certain threshold) that "there is congestion on common network links caused by users using application W." If automatic remediation is enabled for this particular query, the manager sends instructions to the collector to command the SDN controller to tell the appropriate network elements to (a) prioritize user X application Z traffic over other traffic, or (b) disallow traffic involving application W. The (b) remediation approach may require additional policy permission from the operator due to the restrictive nature of the traffic disallowing policy.

Referring to FIG. 4 as an example of the remediation process, suppose that user X is "attached" to switch s3 and that application Z server is "attached" to switch s4. The policy to prioritize user X application Z traffic may be applied by the SDN controller that sends rules to switch s3 that matches user X's IP address (as source IP) and the application server IP address (as destination IP), and has an action that marks the IP diffsery code point (DSCP) bits to represent the highest class of service. Similarly, the reverse rule is applied to switch s4 (i.e., with the source and destination IP addresses flipped).

Alternatively, the rules may be applied to all switches along the communication path. These rules have similar match fields, but the action field directly sends the traffic to the highest priority queue. If the policy is to drop user X application Z traffic, the rules are applied to the edge switches s3 and s4, respectively. This is a usefulness technique since the rules do not need to be applied everywhere in the network.

Another example of the automated remediation process is in the configuration domain. For example, for a query "there is a problem with application X," suppose that the top-ranked answer is "the problem appears to be that switch Y is dropping packets due to a misconfigured maximum transmission unit (MTU) value." The present system and method remediates this situation automatically by sending instructions to the collector to command the SDN controller to reconfigure the MTU value of the appropriate switch.

According to some embodiments, one of the applications of turning visibility into control is a full-fledged distributed firewall. For example, the operator sets up a policy "user X cannot access application Y," or "user X may be barred from the network for Y minutes after Z failed logon attempts." In other example, the operator sets up a policy to isolate (e.g., on a quarantine VLAN®) a user whose traffic exhibits malicious or anomalous behavior. The detection and manual or automatic remediation of an anomaly (e.g., a detected DOS attack) can also be addressed within the control framework of the present system and method.

Figure 12:
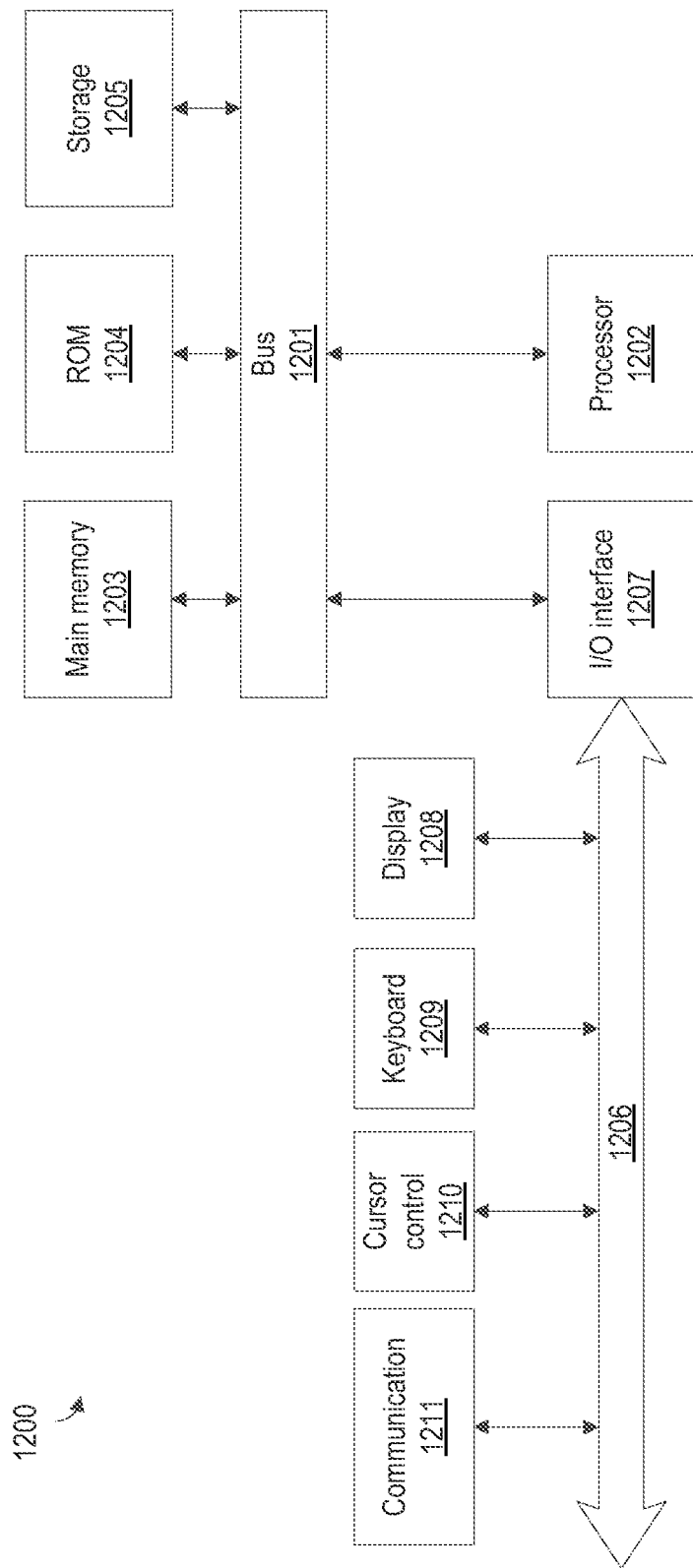
FIG. 12 illustrates an exemplary computer architecture, according to one embodiment

FIG. 12 illustrates an exemplary computer architecture that may be used for the present system, according to one embodiment. The exemplary computer architecture may be used for implementing one or more components described in the present disclosure including, but not limited to, the present system. One embodiment of architecture 1200 includes a system bus 1201 for communicating information, and a processor 1202 coupled to bus 1001 for processing information. Architecture 1200 further includes a random access memory (RAM) or other dynamic storage device 1203 (referred to herein as main memory), coupled to bus 1201 for storing information and instructions to be executed by processor 1202. Main memory 1203 also may be used for storing temporary variables or other intermediate information during execution of instructions by processor 1202. Architecture 1200 may also include a read only memory (ROM) and/or other static storage device 1204 coupled to bus 1201 for storing static information and instructions used by processor 1202.

A data storage device 1205 such as a magnetic disk or optical disc and its corresponding drive may also be coupled to architecture 1200 for storing information and instructions. Architecture 1200 can also be coupled to a second I/O bus 1206 via an I/O interface 1207. A plurality of I/O devices may be coupled to I/O bus 1206, including a display device 1208, an input device (e.g., an alphanumeric input device 1209 and/or a cursor control device 1210).

The communication device 1211 allows for access to other computers (e.g., servers or clients) via a network. The communication device 1211 may include one or more modems, network interface cards, wireless network interfaces or other interface devices, such as those used for coupling to Ethernet, token ring, or other types of networks.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed:

1. A system for simultaneously and centrally analyzing a plurality of networks, the system comprising:
a non-transitory computer readable collector memory;
one or more collectors configured to receive network traffic data from a plurality of network elements in the plurality of networks, wherein a first network of the plurality of networks is from a first company and a second network of the plurality of networks is from a second company, wherein the one or more collectors are stored in the non-transitory computer readable collector memory that is executed by a collector processor;
a programmable network element that is a programmable switch, router, or wireless access point;
a non-transitory computer readable manager memory; and
a remote network manager configured to receive metadata from the one or more collectors, and further configured to simultaneously and centrally analyze (1) the network traffic data from the plurality of network elements in the plurality of networks and (2) network management data from a plurality of enterprise systems in the plurality of networks, wherein the network management data includes L1 through L7 network topology data, network configuration data, and simple network management protocol data, wherein the remote network manager is stored in the non-transitory computer readable manager memory that is executed by a manager processor;
wherein the remote network manager combines the network traffic data from the plurality of networks and the network management data from the plurality of enterprise systems in the plurality of networks into combined cross-network data from multiple companies for simultaneous and central analysis of the combined cross-network data from the multiple companies,
wherein the remote network manager identifies a network control objective for the network, identifies a programmable parameter of the programmable network element to achieve the network control objective, and programs the programmable network element, wherein the network control objective is security or performance remediation,
wherein the remote network manager identifies specific users, applications, and devices causing security or performance issues, and wherein the programmable parameter identified by the remote network manager is blocking the specific users, applications, and devices causing the security or performance issues,
wherein the system implements control policies that summarize and index higher layer information about users, applications, devices, and behaviors using machine learning, wherein the higher layer information is queryable using natural language processing, and wherein the control policies automatically adjust to changes in network topology.

2. The system of claim 1, wherein the system learns a pattern by identifying specific network, protocol, and wireless metrics to determine application performance.

3. The system of claim 1, wherein the one or more collectors receive mirror traffic data from the plurality of network elements.

4. The system of claim 1, wherein the one or more collectors are further configured to index the network enabling efficient search and retrieval of the metadata.

5. The system of claim 1, wherein the remote network manager is disposed in a cloud.

6. The system of claim 1, wherein the one or more collectors program the programmable network element to configure the programmable network element to send filtered network traffic data to the one or more collectors.

7. The system of claim 1, wherein network analysis is performed using the metadata.

8. The system of claim 1, wherein a control loop is applied to determine whether a network control objective is met after programming the programmable network element.

9. The system of claim 1, wherein the one or more collectors are further configured to receive statistics about the network, topology information about the network, input from one or more enterprise systems, or combinations thereof.

10. The system of claim 9, wherein the metadata received from the network traffic data is time-aligned with data received from the one or more enterprise systems.

11. The system of claim 1, wherein the remote network manager programs the programmable network element to configure the programmable network element to send filtered network traffic data to the one or more collectors.

12. The system of claim 1, wherein the remote network manager affects a network policy by programming a programmable network element with a control primitive, wherein the control primitive includes an access control list (ACL), quality of service (QoS), rate limit settings, or combinations thereof.

13. The system of claim 12, wherein the remote network manager maintains a relationship between a network policy and the control primitive in a database.

14. The system of claim 1, wherein the remote network manager de-duplicates the metadata received from the one or more collectors.

15. The system of claim 1, wherein the remote network manager calculates a quality of experience of a user, an application, or a device, based on the metadata received from the one or more collectors.

16. A method for simultaneously and centrally analyzing a plurality of networks, the system comprising:
accessing a non-transitory computer readable collector memory;
accessing one or more collectors configured to receive network traffic data from a plurality of network elements in the plurality of networks, wherein a first network of the plurality of networks is from a first company and a second network of the plurality of networks is from a second company, wherein the one or more collectors are stored in the non-transitory computer readable collector memory that is executed by a collector processor;
accessing a programmable network element;
providing a non-transitory computer readable manager memory;
providing a remote network manager configured to simultaneously and centrally analyze (1) the network traffic data from the plurality of network elements in the plurality of networks and (2) network management data from a plurality of enterprise systems in the plurality of networks, wherein the network management data includes L1 through L7 network topology data, network configuration data, and simple network management protocol data, wherein the remote network manager is stored in the non-transitory computer readable manager memory that is executed by a manager processor, wherein the remote network manager combines the network traffic data from the plurality of networks and the network management data from the plurality of enterprise systems in the plurality of networks into combined cross-network data from multiple companies for simultaneous and central analysis of the combined cross-network data from the multiple companies;
identifying, using the remote network manager, a network control objective for the network and a programmable parameter of the programmable network element to achieve the network control objective, wherein the remote network manager identifies specific users, applications, and devices causing security or performance issues; and
programming the programmable network element with the programmable parameter based on the metadata received from the plurality of network elements in the network, wherein the network control objective is security or performance remediation, and wherein the programmable parameter identified by the remote network manager is blocking the specific users, applications, and devices causing the security or performance issues,
wherein the system implements control policies that summarize and index higher layer information about users, applications, devices, and behaviors using machine learning, wherein the higher layer information is queryable using natural language processing, and wherein the control policies automatically adjust to changes in network topology.

17. The system of claim 1, wherein the system extracts features from the network traffic data, summarizes data regarding extracted higher layer information from the network traffic data, and indexes the summarized data in a database for pattern identification.

18. The system of claim 17, wherein the higher layer information includes a relationship or binding of higher layer data to lower layer data, wherein higher layer data corresponds to users, applications, devices, or combinations thereof, and wherein lower layer data corresponds to IP and MAC addresses, ports, or combinations thereof.

19. The system of claim 1, wherein the control policies account for network topology and capabilities to enforce a security policy as close to an edge of the network as possible, instead of at logical or physical network choke points.

20. The system of claim 11, wherein the one or more collectors are programmable, and wherein the remote network manager programs the one or more collectors to collect different types of metadata.

* * * * *